United States Patent
Takumah

(10) Patent No.: US 11,116,615 B2
(45) Date of Patent: Sep. 14, 2021

(54) MOLAR LIFT ORAL INSERTION, DISPOSABLE ATTACH DOUBLE LEVEL PANORAMA FORM BRISTLE BRUSH TILTER

(71) Applicant: Maluki Takumah, Atlanta, GA (US)

(72) Inventor: Maluki Chakita Takumah, Atlanta, GA (US)

(*) Notice: Subject to any disclaimer, the term of this patent is extended or adjusted under 35 U.S.C. 154(b) by 105 days.

(21) Appl. No.: 16/365,829

(22) Filed: Mar. 27, 2019

(65) Prior Publication Data
US 2020/0306022 A1    Oct. 1, 2020

(51) Int. Cl.
| A61C 19/06 | (2006.01) |
| A46B 9/04 | (2006.01) |
| A61C 17/22 | (2006.01) |
| A61C 3/00 | (2006.01) |
| A46B 13/02 | (2006.01) |
| A61C 19/00 | (2006.01) |

(52) U.S. Cl.
CPC ............ *A61C 17/228* (2013.01); *A46B 9/045* (2013.01); *A61C 3/005* (2013.01); *A61C 19/006* (2013.01); *A61C 19/06* (2013.01)

(58) Field of Classification Search
CPC ....... A61C 17/32; A61C 17/228; A61C 17/34; A61C 17/3472; A61C 17/3481; A61C 17/349; A46B 9/045; A46B 220/1066
See application file for complete search history.

(56) References Cited

U.S. PATENT DOCUMENTS

| 7,537,451 B1 * | 5/2009 | Ramnarine | .......... A61C 17/005 15/22.1 |
| 2015/0282911 A1 * | 10/2015 | Steiner | ................. A61C 17/228 15/22.2 |
| 2017/0100223 A1 * | 4/2017 | Silverberg | ......... A46B 15/0008 |

FOREIGN PATENT DOCUMENTS

| KR | 101195723 B1 * | 10/2012 |
| KR | 101384656 B1 * | 4/2014 |

* cited by examiner

*Primary Examiner* — Daniel J Colilla
(74) *Attorney, Agent, or Firm* — Silver Legal LLC; Jarrett L. Silver

(57) ABSTRACT

A multi-purpose molar lift oral insertion and double level panorama form designed bristle brush tilter provides a thorough oral cleaning for dental and gums. Described is a small mechanism apparatus designed to assist with brushing teeth and other oral operations, and works especially well for persons that have difficulty with brushing their teeth. The device includes a molar gap tilt lift platform set between the upper molars and the lower molars to cause a gap or space between to upper and bottom jaw. The oral insertion can be enclosed in the mouth. A pivot axle attached to a double level bristle brush can swivels on a shaft pin allowing a user to oscillate or maneuver in left or right directions and up and down with just a touch of the fingertip.

21 Claims, 27 Drawing Sheets

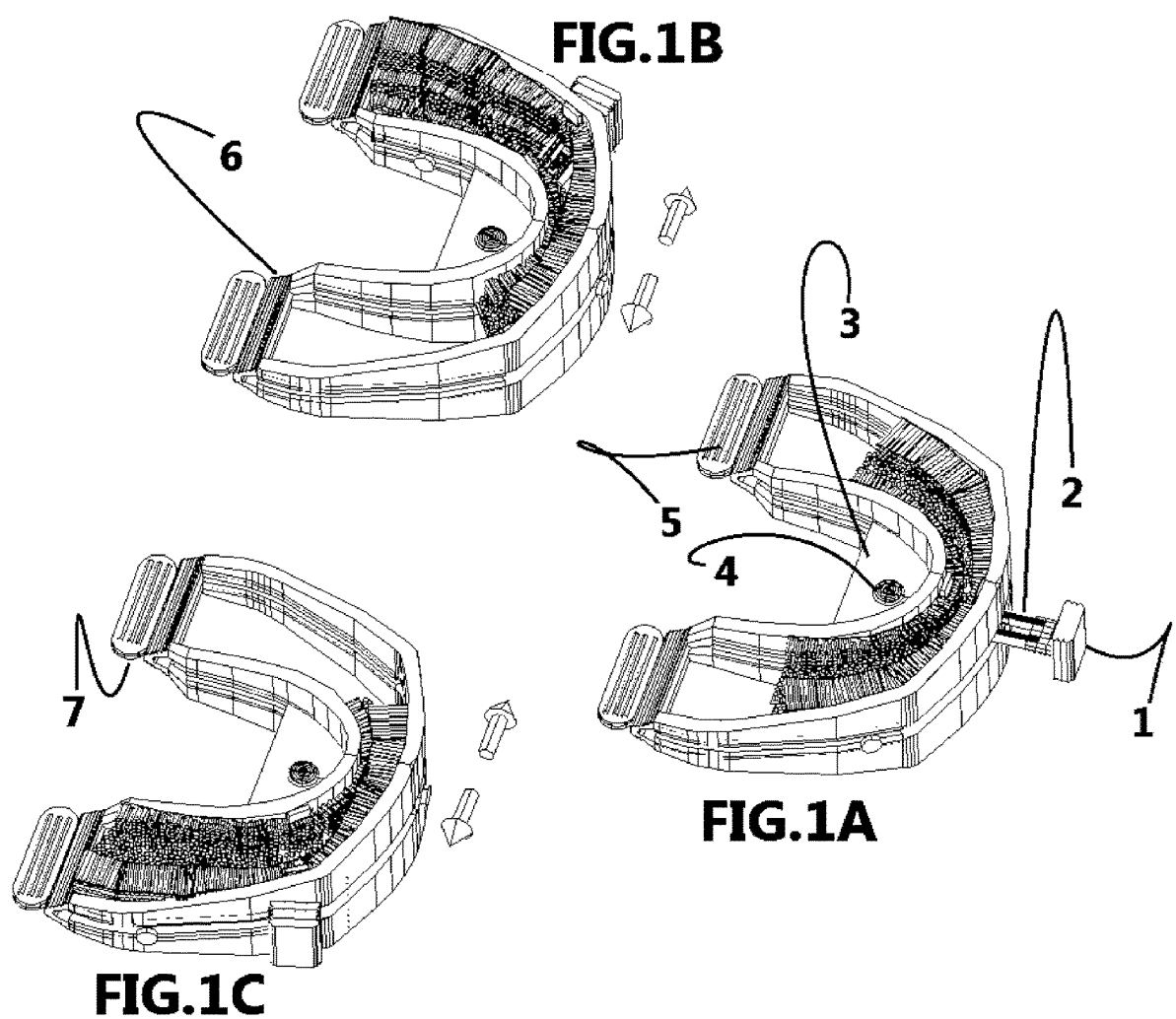

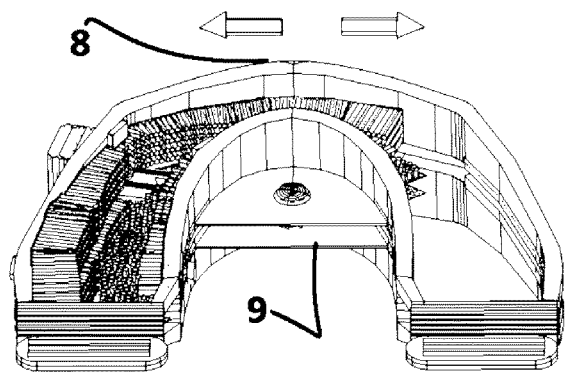
FIG.1D
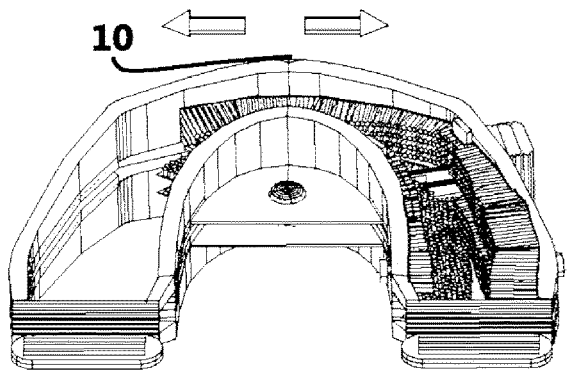
FIG.1E
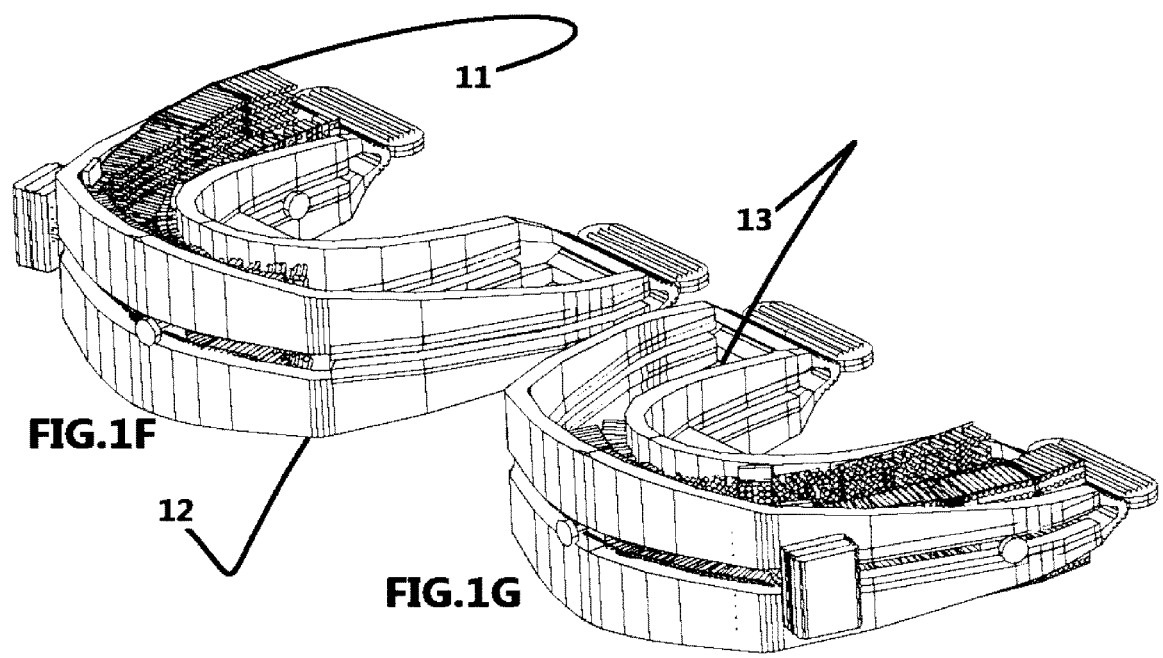
FIG.1F
FIG.1G

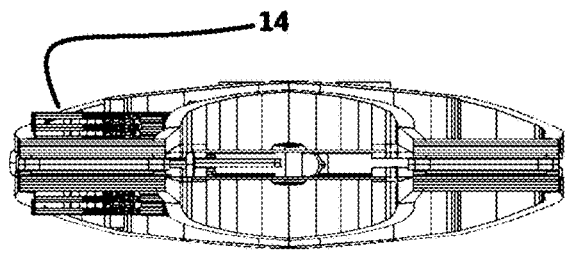
FIG.2A
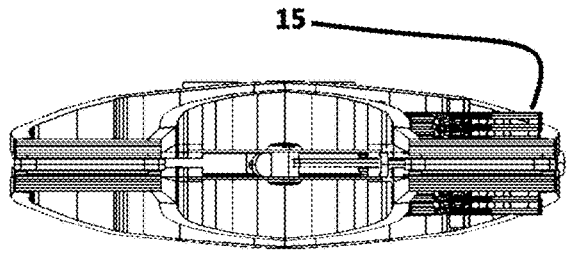
FIG.2B
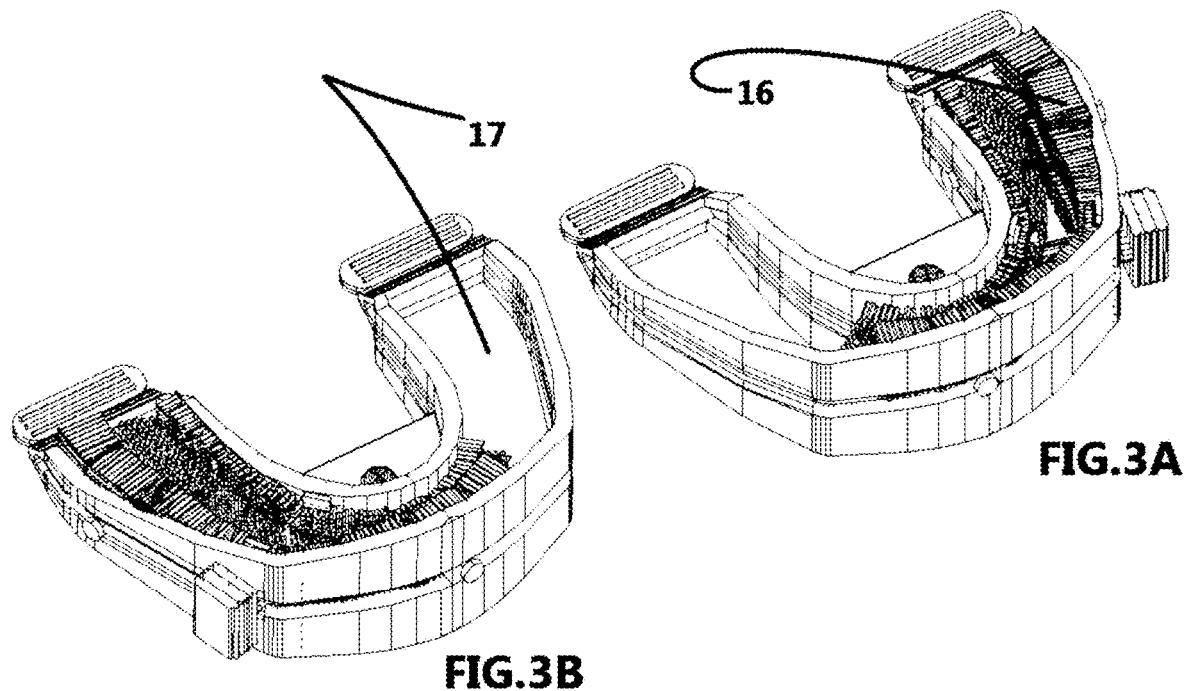
FIG.3A
FIG.3B

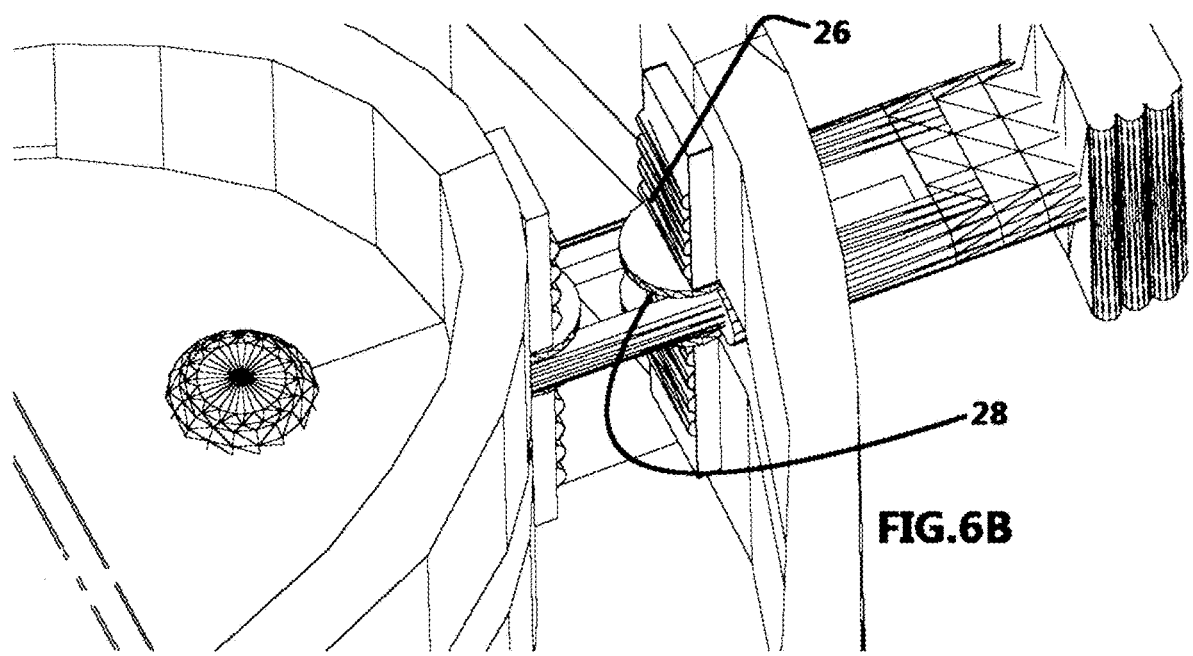

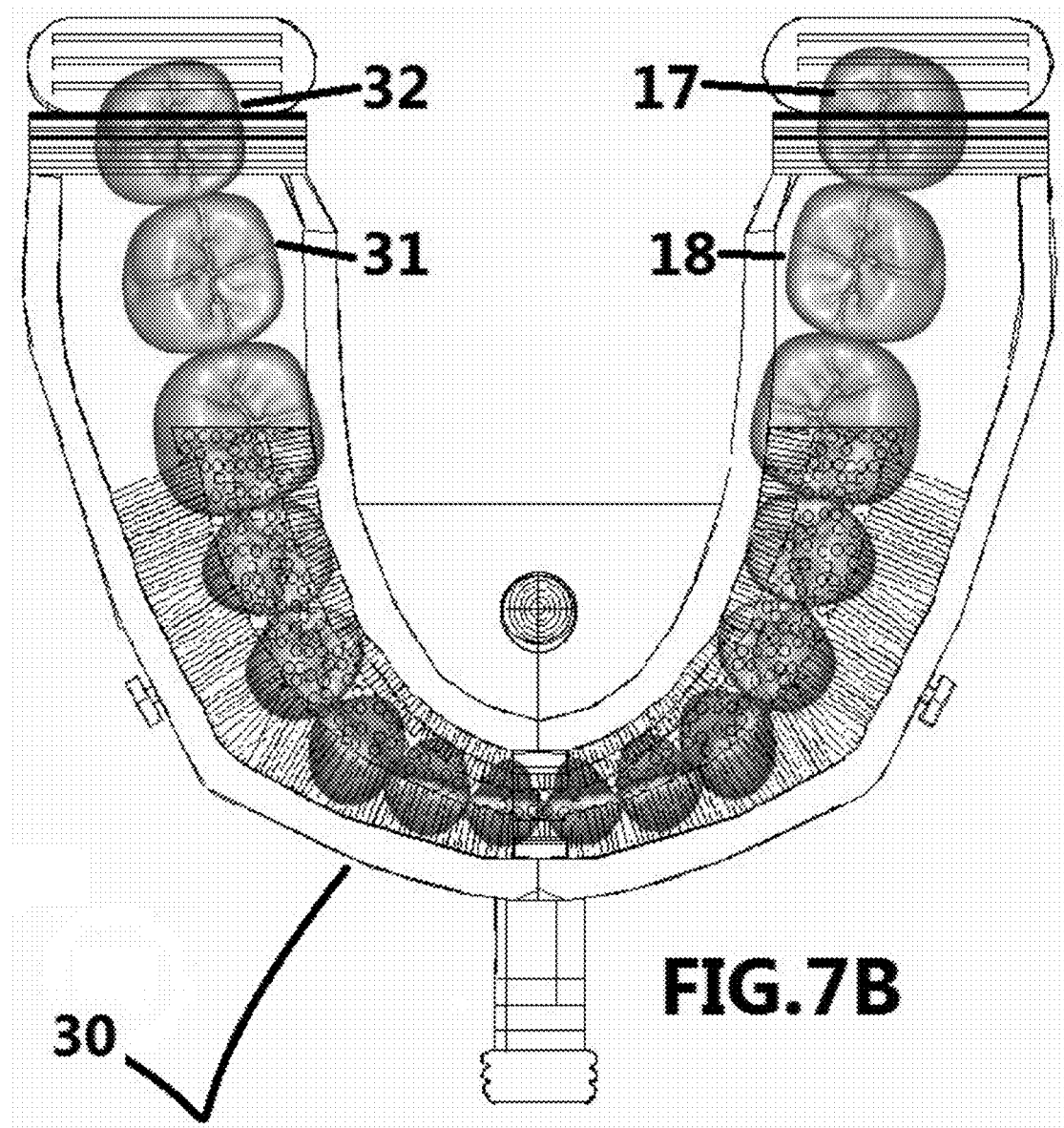

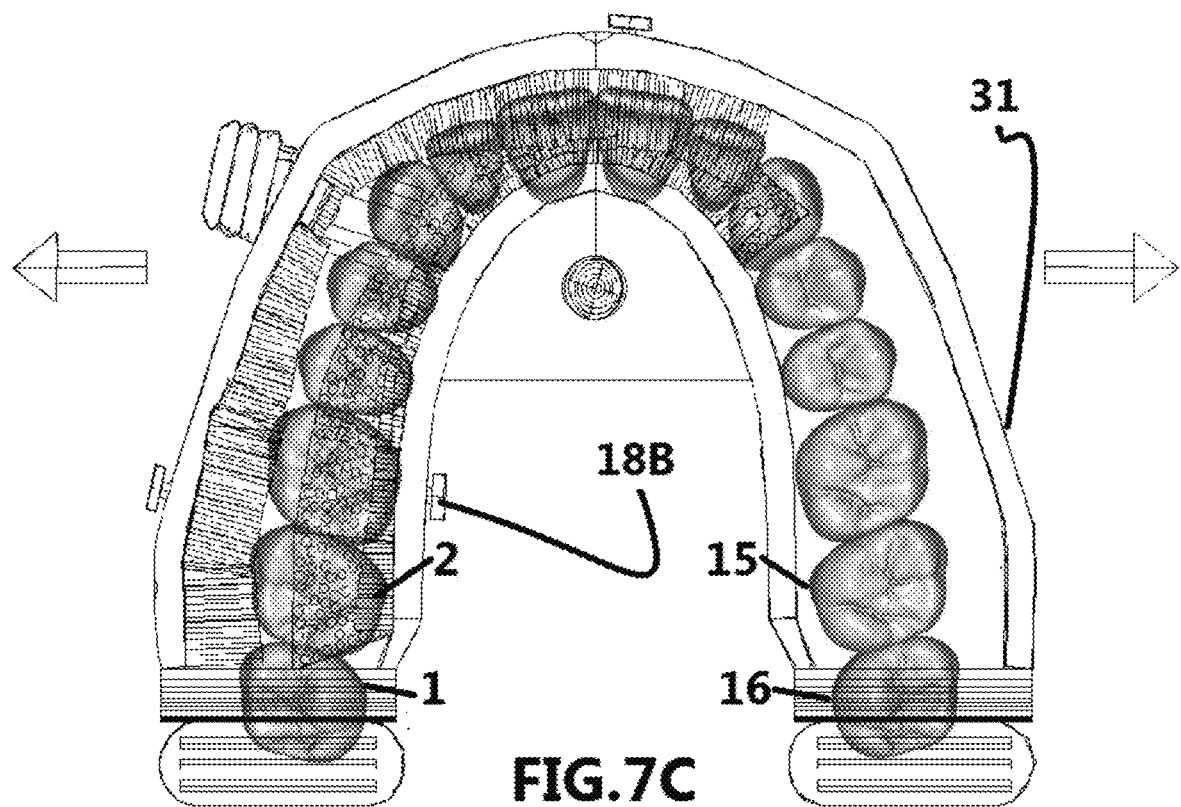
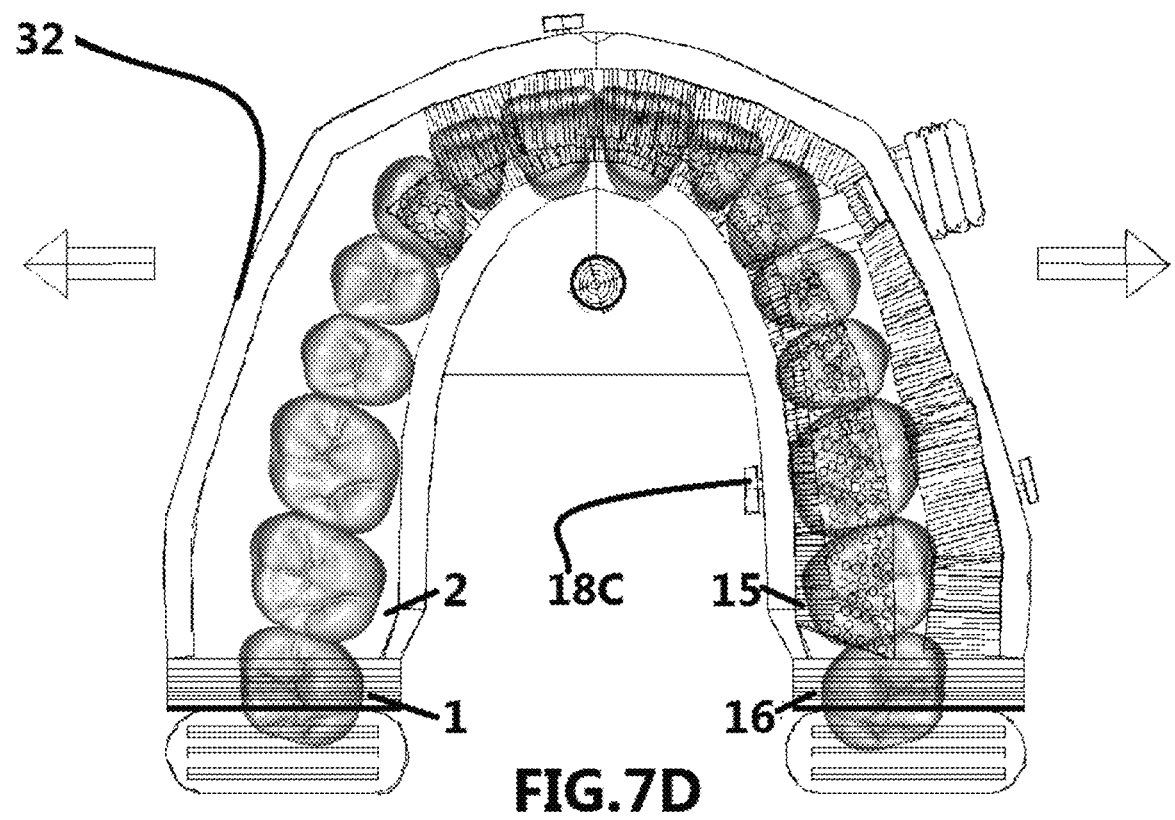

MOLAR LIFT ORAL INSERTION, DISPOSABLE ATTACH DOUBLE LEVEL PANORAMA FORM BRISTLE BRUSH TILTER

This application is a NON-Provisional Patent Application, filed Mar. 27, 2019.

SUMMARY OF THE INVENTION

Briefly described, the present invention provides molar lift oral insertion, disposable attach double level panorama form bristle brush tilter. This invention is designed as an advance dental device for those who suffer health discrepancies and a busy, preoccupy life.

Accordingly, an object of this invention is to provide thorough oral cleaning for dental and gums in an unconventional or distinctive hygienic way in the mouth.

Another object of this invention is to provide a healthy gum line make sure they're pink and that the gum line hugs tightly around the teeth. The oral insertion device's panorama designed bristle brush gives the teeth and gum better cleaning surface.

Another object of this invention is to provide comforted in the jaw muscles and less facial muscle stretches on the face.

Another object of this invention is to provide comforted on the neck and shoulder to avoid stiffness stretches stressfulness on the upper body.

Another object of this invention is to provide comforted for those who suffer from Dislocation of the glenohumeral joint, Arthritis, Tear of the rotator cuff, fractured clavicle, and fractured scapula on the upper body.

Another object of this invention is to provide comforted for parents struggling cleaning their preoperational child's teeth.

There and other objects, features and advantages of this invention will become apparent from the following detailed description.

TECHNICAL FIELD

The present invention related purposes to these dental care items that meant for a oscillation meaning behavioral maneuverable procedure by an object and a scrub meaning application of the oral cleaning ointment field such as tooth brush bristles, tooth sticks. And the other alternative for this present invention related purposes to these items that are meant to fragrance the oral cavity like for example oral cleaning paste and liquid wash (spray)

This present invention is manual control by hand and also rechargeable electric control motor driven unit.

In this application, the following terms will be understood to have the indicated definitions:

Oral Cleaning Ointment—this present invention is unconventional and need a new social practice to put oral cleaning ointment all around the present invention.

Replacing attached bristle brush—this present invention is also designed to prevent over waste plastics going in marine ocean animals and landfills. The new invention's waste is its replaceable disposable double level panorama form designed bristle brush.

$3^{rd}$ molar and 2nd molar teeth—the new invention have its main and most important feature call the molar gap tilt lift platform that's designed for the $3^{rd}$ molar teeth numbered 1, 16, 32, 17 and level support platform that's designed for the 2nd molar teeth numbered 2, 15, 31, 18.

In a lot of situations the $3^{rd}$ molar teeth or wisdom teeth is pulled out of jaw. Then the level support platform that's designed for the 2nd molar teeth numbered 2, 15, 31, 18 is designed to do the same purpose that is to cause a space between the lower jaw and the upper jaw.

Oscillation maneuverable swivel mechanism—this new invention is designed with a feature called a pivot axle that's pin down by its double level stabilizer. The adjustable pivot axle purpose is to oscillate or curve parallel on each opposite side of the device. The pivot axle's dismantling to replace old disposable double level bristle brush is easy to install new double level bristle brush in its device.

BRIEF DESCRIPTION OF THE DRAWINGS

FIG. 1A-1G. are views of the oral insertion in an right angle position left angle position and rear angle position on the view plan. The oral insertion specifies its usage by oscillate parallels from side to side on the pivot axle.

FIG. 2A-2B. a visual flat rear image of the oral insertions and its left and right side action of the disposable attached double level brush.

FIG. 3A-3B. a perspective of the upper front right view that illustrates the main feature which is the molar gap tilt lift platform. Also the oral insertion's double level panorama form bristle brush positioning the oscillate parallels from side to side by tapping the pivot axle tab. The oral insertion desired swivel direction leaves an empty space on its opposite side hollow cavity.

FIG. 6A-6B. an enlarged upper left angle and upper right angle visual of the double swivel pin slot bristle brush hooks.

FIG. 7A-7F. shows a detailed x-ray view of the oral insertion and partial numbered molar area within a standard teeth eruption pattern. Also full detail that illustrates the pivot axle oscillates or curved parallel and both directions covering each sides of the eruption teeth pattern.

DETAILED DESCRIPTION OF THE INVENTION

The present invention described as oral insertion. The main and most important feature on the invention is the molar gap tilt lift platform. This present invention won't operate and will not function without its molar gap tilt lift platform. The molar gap tilt lift platform is designed to cause a gap or a space between upper jaw and bottom jaw. The molar's designed platform gives the inner oral maneuverability for the oral insertion's double level panorama form bristle brush. The oral insertion's double level bristle brush parallel on an oscillation swivel shaft pin.

This present new invention has several key factors designed into the oral insertion.

The main key feature includes indispensable molar gap tilt lift platform, followed by other key features; adjustable pivot axle (double swivel pin slot bristle brush hooks), rail track slot knobs, disposable attached double panorama form level bristle brush.

Figure 1H:
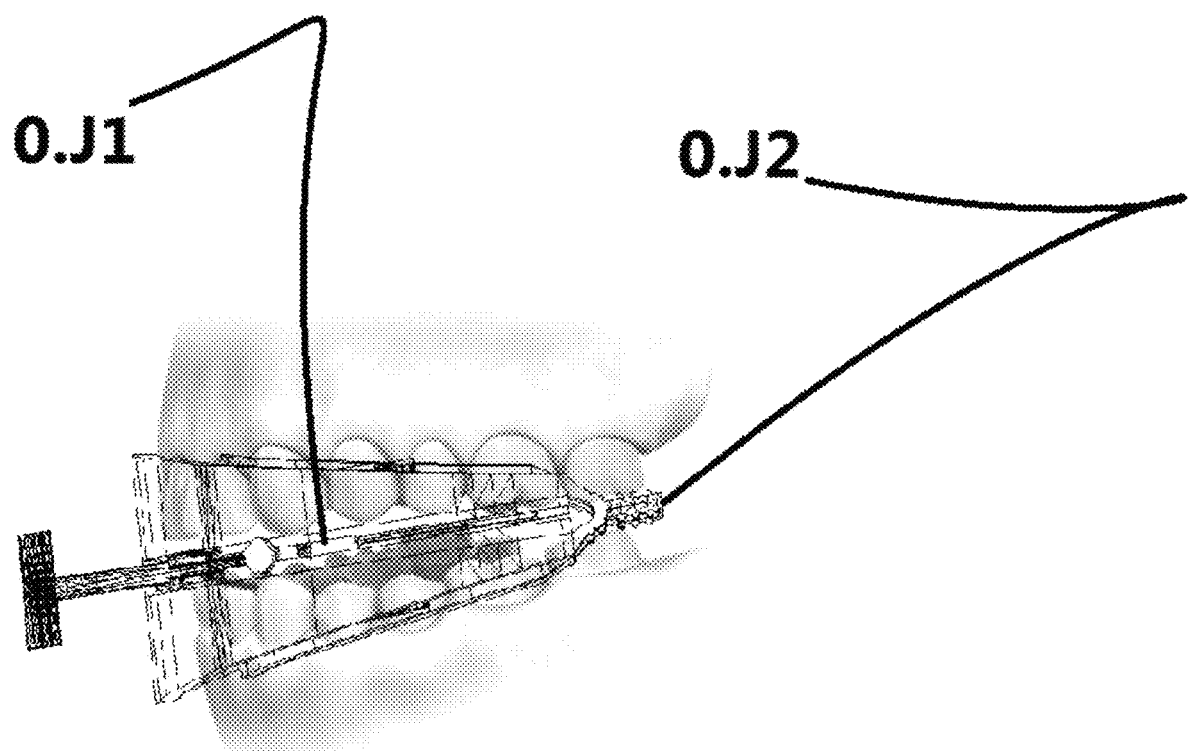
FIG. 1H-1I. illustrate detailed x-ray vision on the oral insertion ability to perform and beneficial results with its molar gap tilt lift platform. The jaws illustrate thrust maneuvering on its own to get the right positioning on the rear molar.
Figure 1I:
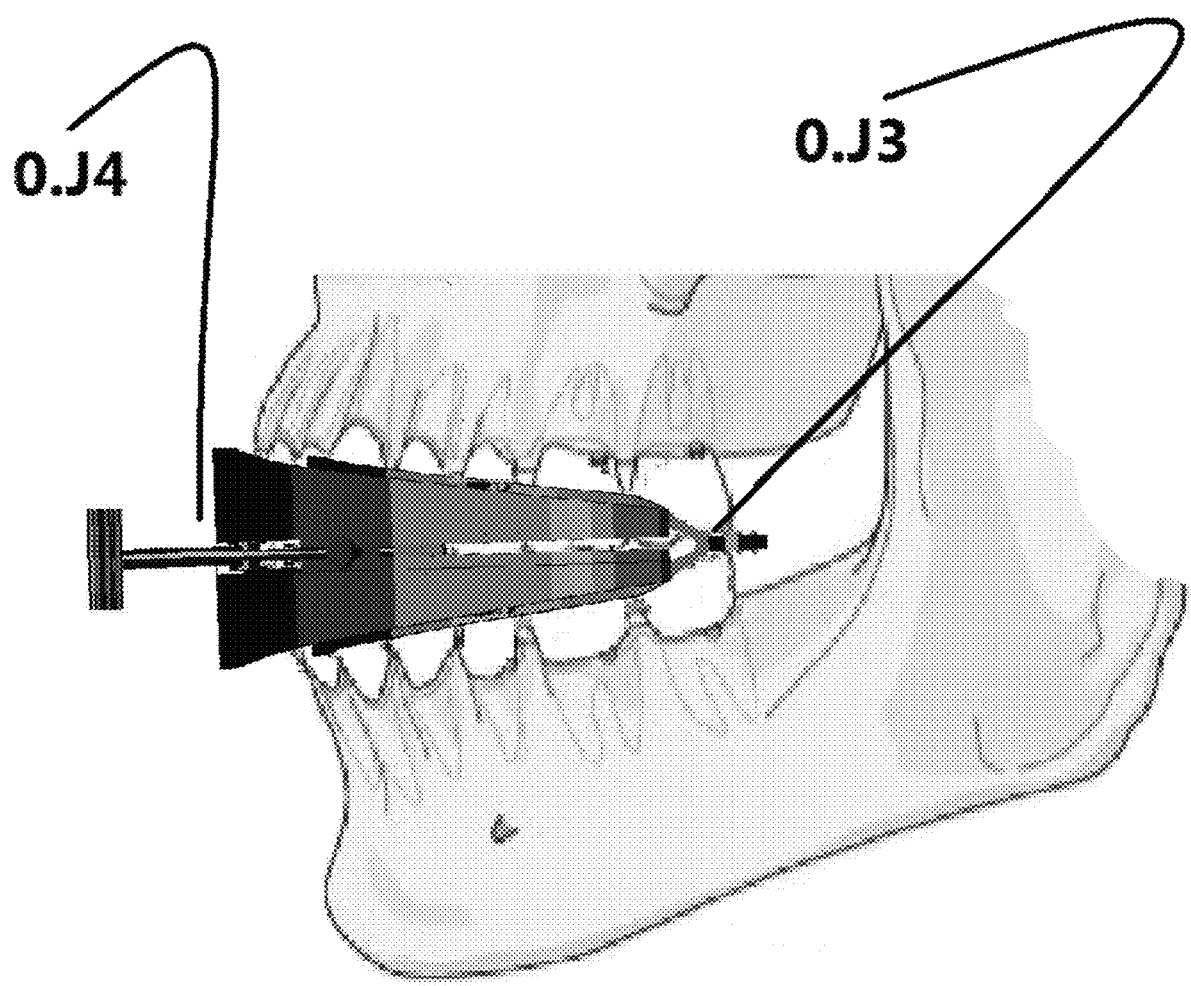

FIG. 1H-1I shows an embodiment of this invention. FIG. 1H indicates a space between the upper jaw and bottom jaw 0.J1 illustrates the molar gap tilt lift platform effects in detailed x-ray vision of the left side jaw. The oral insertion's molar gap tilt lift platform area cause a maneuverability space between its upper lower jaws cavity 0.J2. In FIG. 1I shows the molar gap tilt lift platform effect on its oral insertion. The molar gap tilt lift platform lies on the target areas which indicates 2nd molar and the 3rd molar teeth. The 2nd molar teeth consist of upper and lower teeth that's label 2, 15, 31, 18. The 3rd molar teeth consist of upper and lower teeth that's label 1, 16, 32, 17, 0.J3 shows a rendering model of the oral insertion 0.J4.

FIGS. 1A-1G shows an embodiment of this invention. FIG. 1A shows pivot axle thumb tab 1 illustrates right angle of the oral insertion with its adjustable pivot axle positioned equidistant 2 a visual of the upper level swivel stabilizer 3 a view of the rotate shaft pin 4 shows the platform's surface grips. The surface grips is designed to clean and scrape its bottom and beneath surfaces of the molar teeth area 5.

In FIG. 1B illustrates right angle of the oral insertion with its pivot axle curved parallel left side that shows level support platform designed for the molar's 2nd teeth pattern 6. In FIG. 1C shows the most important feature which is the molar gap tilt lift platform. The oral insertion is shown on its right angle view in this figure single out the molar gap tilt lift platform designed for the 3$^{rd}$ molar. The 3$^{rd}$ molar gap tilt lift platform feature the most credibility to be used in all lift purposes for creating a space between upper and lower jaw 7. In FIG. 1D shows the oral insertion rear position tilted up view with its pivot axle curve parallel to the left side 8 shows the bottom base double level swivel stabilizer that's a housing of the rotate shaft pin 9. In FIG. 1E shows the oral insertion rear position tilted up view with its pivot axle curve parallel to the right side 10. In FIG. 1F shows the disposable attach flexible flat surface of the bristle brush 11 illustrates left angle of the oral insertion with its pivot axle curved parallel right side 12 In FIG. 1G illustrates left angle of the oral insertion with its pivot axle curved parallel left side 13.

The example oral insertion including or excluding the panoramas and molar gap tilter can be made from one or more of the following: polymeric materials from the group consisting of plastic materials, elastic polymeric materials from the group consisting of rubber materials, and stainless steel material formed from the group consisting of metal materials. As demonstrated in the stainless steel example, a material listed, e.g., a metal, does not have to be a single element, plastic, etc.

FIGS. 2A-2B shows an embodiment of this invention. FIG. 2A illustrates rear plan view of the oral insertion with its pivot axle curved parallel left side 14. In FIG. 2B illustrates rear plan view of the oral insertion with its pivot axle curved parallel right side 15.

FIGS. 3A-3B shows an embodiment of this invention. FIG. 3A shows a lower right angle plan view of the oral insertion with its pivot axle and double level bristle brush curved parallel left that's attached on its double swivel pin slot hook axle. In this figure shows the oral insertion's act of leaving the opposite side an empty cavity 16. In FIG. 3B shows a lower right angle plan view of the oral insertion with its pivot axle and double level bristle brush curved parallel right that's attached on its double swivel pin slot hook axle. In this figure shows the oral insertion's act of leaving the opposite side an empty cavity 17.

Figure 4A:
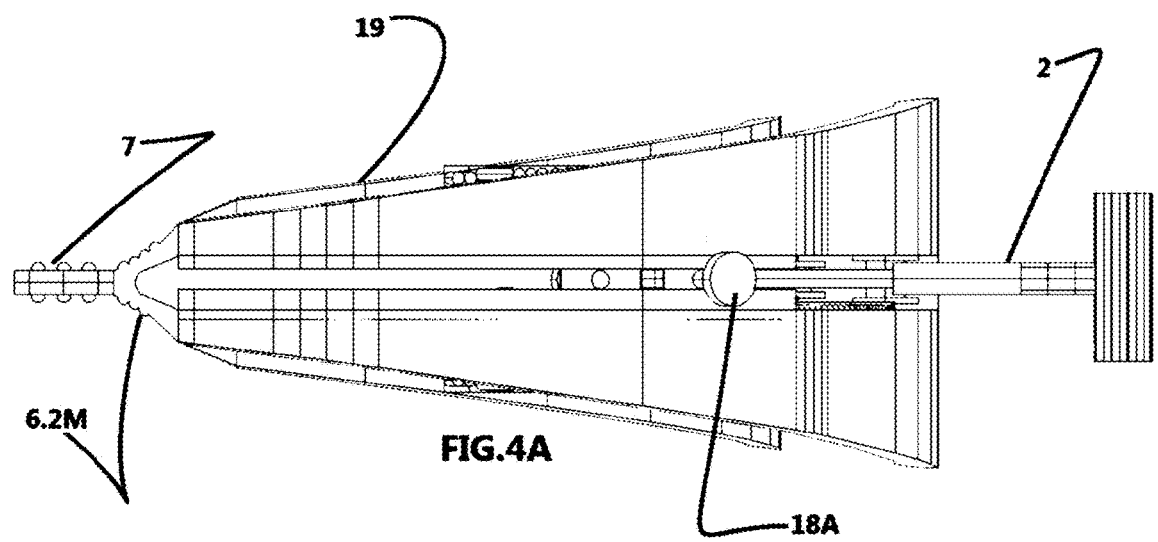
FIG. 4A-4E. enlarged view of the oral insertion's main area which is called the molar gap tilt lift platform. And oral insertion's right side left side, upper right angle, upper right front angle, and upper left front angle with the pivot axle curved parallel and both directions.
Figure 4B:
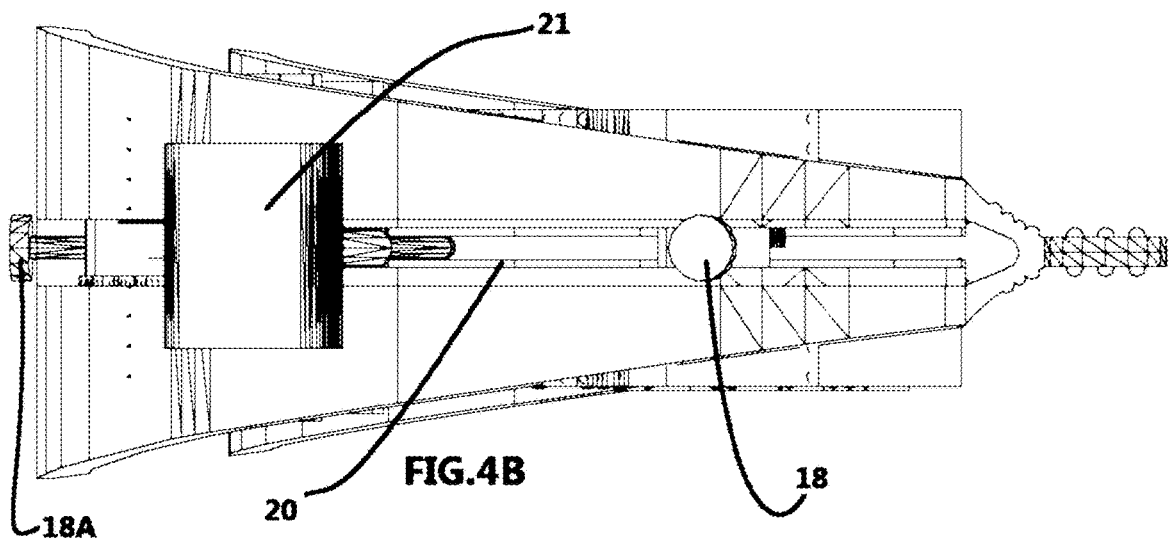
Figure 4C:
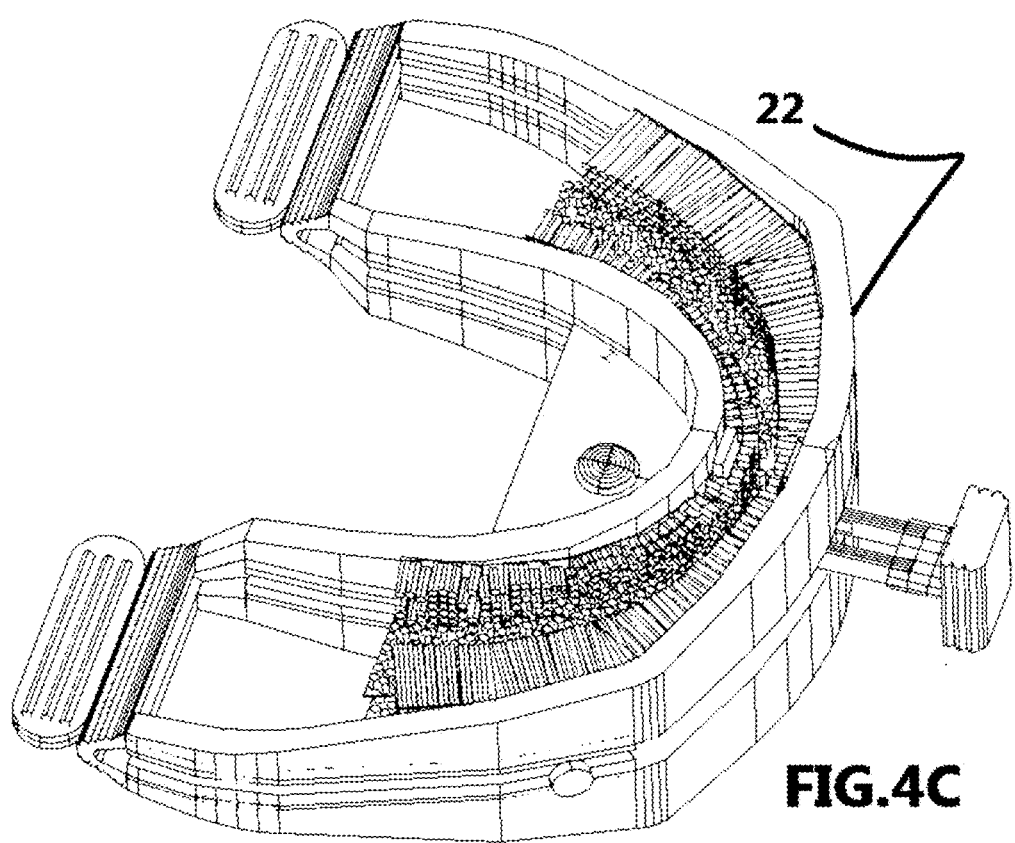
Figure 4D:
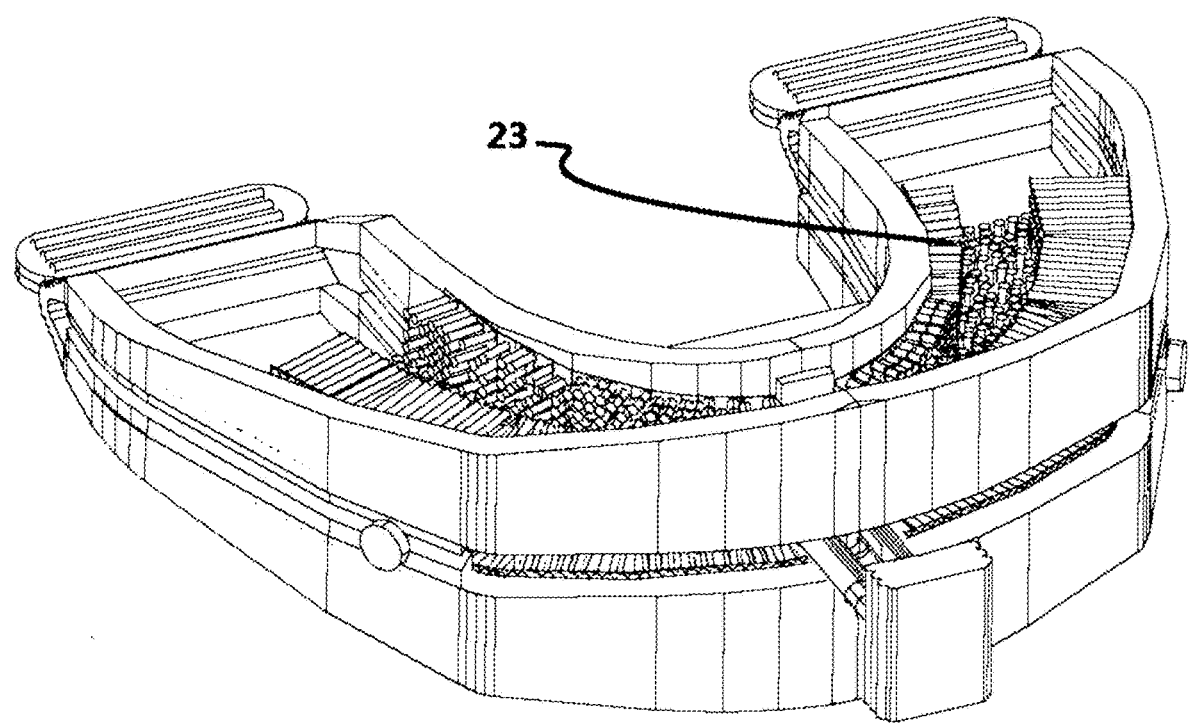
Figure 4E:
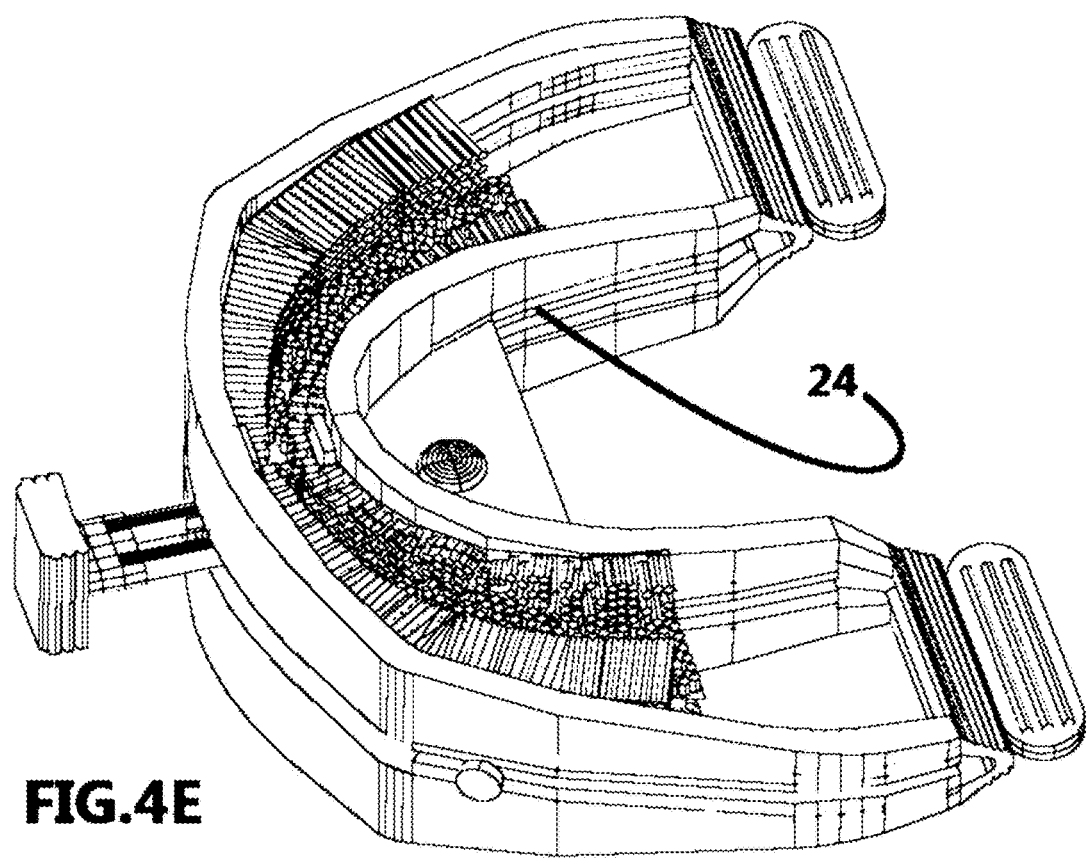

FIGS. 4A-4E shows an embodiment of this invention. FIG. 4A illustrates right angle of the oral insertion with its pivot axle positioned equidistant 2 illustrates right angle of the oral insertion with its pivot axle positioned equidistant that shows level support platform designed for the molar's 2nd teeth pattern 6.2M shows the most important feature which is the molar gap tilt lift platform. The oral insertion is shown on its right angle view in this figure single out the molar gap tilt lift platform designed for the 3rd molar. The 3rd molar gap tilt lift platform feature the most credibility to be used in all lift purposes for creating a space between upper and lower jaw 7 illustrates the outer right rail slot knob designed to keep the double level bristle brush on the oral insertion tracks 18A shows the enlarged right angle view of the whole oral insertion 19 In FIG. 4B illustrates the outer left rail slot knob designed to keep the double level bristle brush on the oral insertion tracks 18 illustrates the outer right rail slot knob designed to keep the double level bristle brush on the oral insertion tracks 18A shows enlarged detail view of the outer left rail tracks 20 illustrates a enlarged detail view of the oral insertion's pivot axle tab curved left 21 In FIG. 4C shows an enlarged right upper front angle oral insertion with its adjustable pivot axle and double level bristle brush positioned equidistant 22 In FIG. 4D shows an detail and enlarged upper near front angle oral insertion with its adjustable pivot axle and double level bristle brush positioned equidistant 23 In FIG. 4E shows a detail enlarged front angle left view of the oral insertion's inner rail track 24.

Figure 5A:
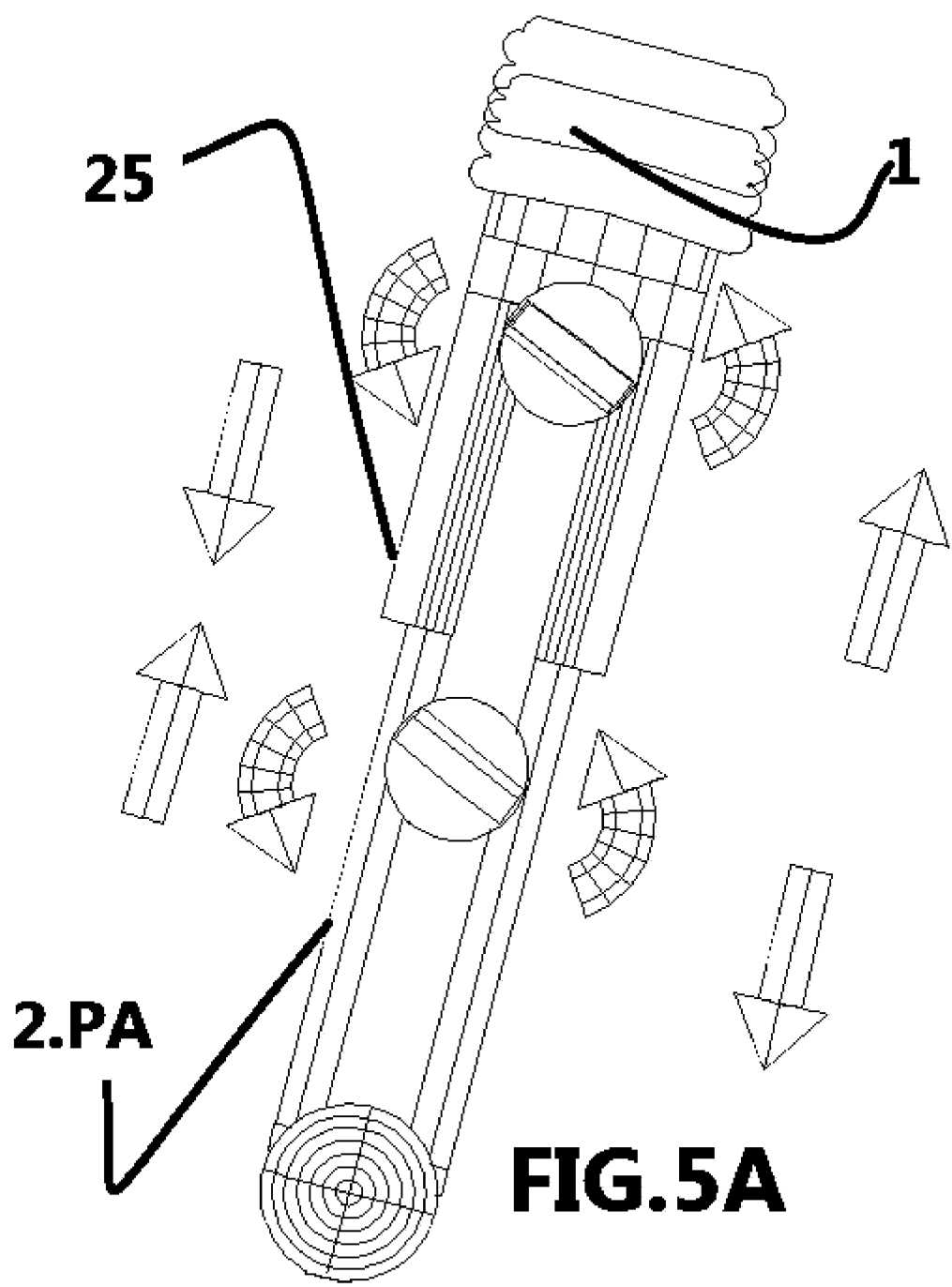
FIG. 5A-5B. illustrate a plan and angle enlarged detail views of the adjustable pivot axle with its rotating swivel shaft pin, double swivel pin slot bristle brush hook.
Figure 5B:
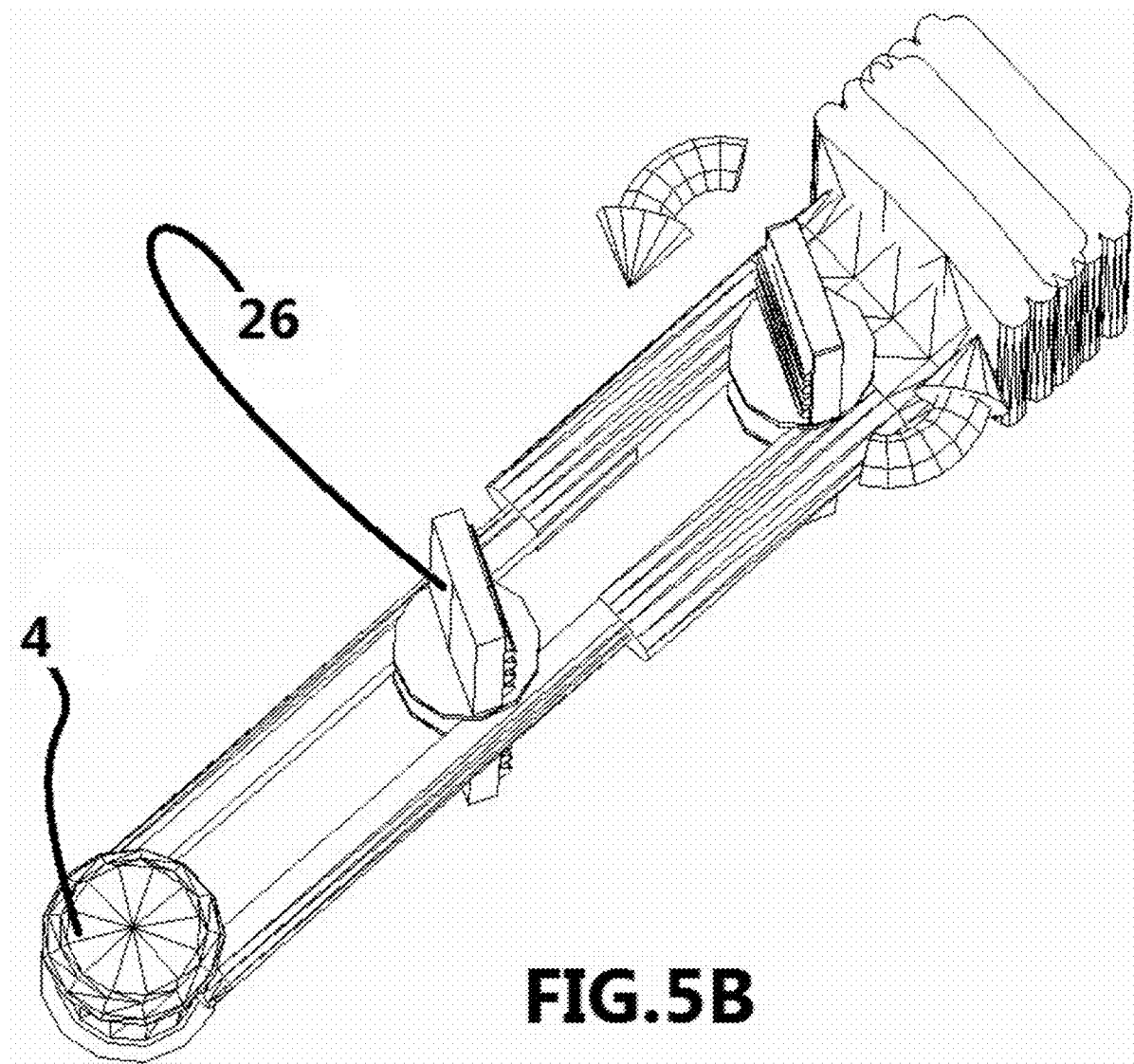

FIGS. 5A-5B shows an embodiment of this invention. FIG. 5A shows pivot axle thumb tab 1 shows an enlarged plan view of the oral insertion with its adjustable pivot axle 2.PA illustrates an adjustable pivot axle that slide inward and outward on its tracks. The pivot axle can be dismantle to replace old double level bristle brush 25 In FIG. 5B a view of the rotate shaft pin 4 shows the double swivel pin slot hook axle that embeds between the opening parallel tracks on the pivot axle 26

Figure 6A:
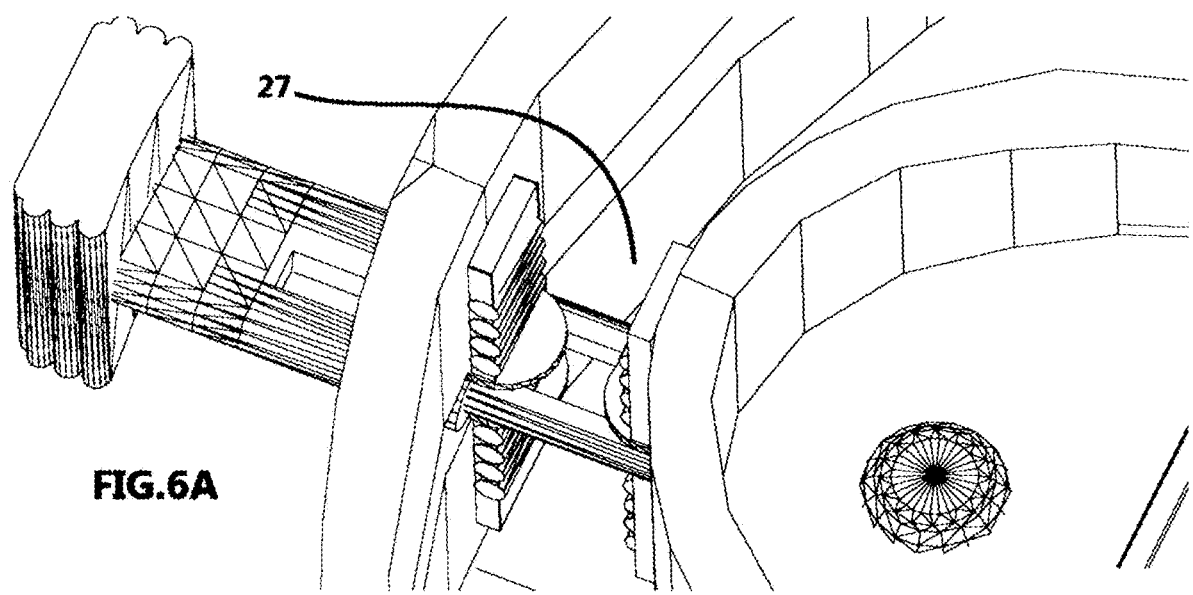

FIGS. 6A-6B shows an embodiment of this invention. FIG. 6A enlarged upper left view of an empty cavity area that will lie its designed part referred as double level attach bristle brush 27 In FIG. 6B shows the double swivel pin slot hook axle that wedge between the opening parallel tracks on the pivot axle 26 illustrates in a upper right enlarged view of the adjustable pivot axle's double swivel pin slot hook axle that's designed with middle loop slot base. The double swivel pin slot hook axle wedge its middle loop slot base between the opening parallel tracks on the pivot axle 28.

Figure 7A:
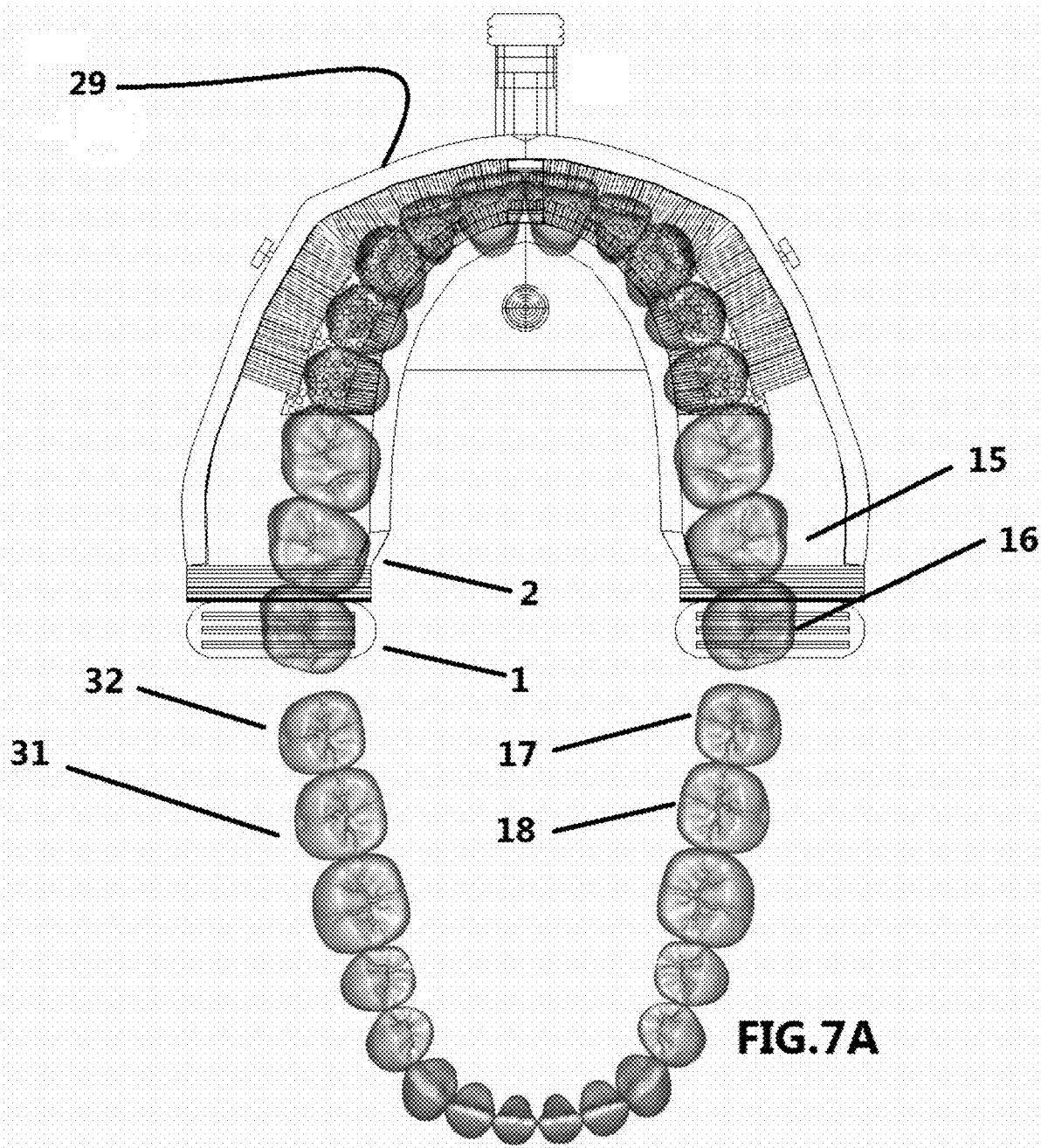

FIGS. 7A-7F shows an embodiment of this invention. FIG. 7A shows an enlarged detail plan view of the complete eruption pattern layout in teeth plan. The upper jaw's central incisors, lateral incisors, canines, First molars fitted with its oral insertion device above the upper jaw. The back molar teeth area is partially numbered in this figure. The 2nd molar teeth consist of upper and lower teeth that's label 2, 15, 31, 18. The 3rd molar teeth consist of upper and lower teeth that's label 1, 16, 32, 17. And enlarged illustration of the oral insertion with its pivot axle positioned equidistant 29. In FIG. 7B shows an enlarged detail plan view of the bottom eruption pattern layout in teeth plan. The bottom jaw's central incisor, lateral incisor, canine (cuspid, eye tooth) first premolar (first bicuspid), second premolar (second bicuspid), first molar (6-yr molar) fitted with its oral insertion device above the upper jaw. The back lower molar teeth area is partially numbered in this figure. The 2nd, $3^{rd}$ molar teeth consist of lower teeth that's label 31, 18, 17, 32. And enlarged illustration of the oral insertion with its pivot axle positioned equidistant 30. In FIG. 7C illustrates the oral insertion's pivot axle curved and parallel covering the teeth upper left side. And the back upper molar teeth area is partially numbered in this figure. The 2nd, 3RD molar teeth consist of lower teeth that's label 2, 1, 15, 16 on the end 31 shows the inner left side rail slot knob that normally positioned beneath the double level swivel stabilizer housing for the rotate shaft pin. The rail slot knob now exposed when in usage 18B.

Figure 7E:
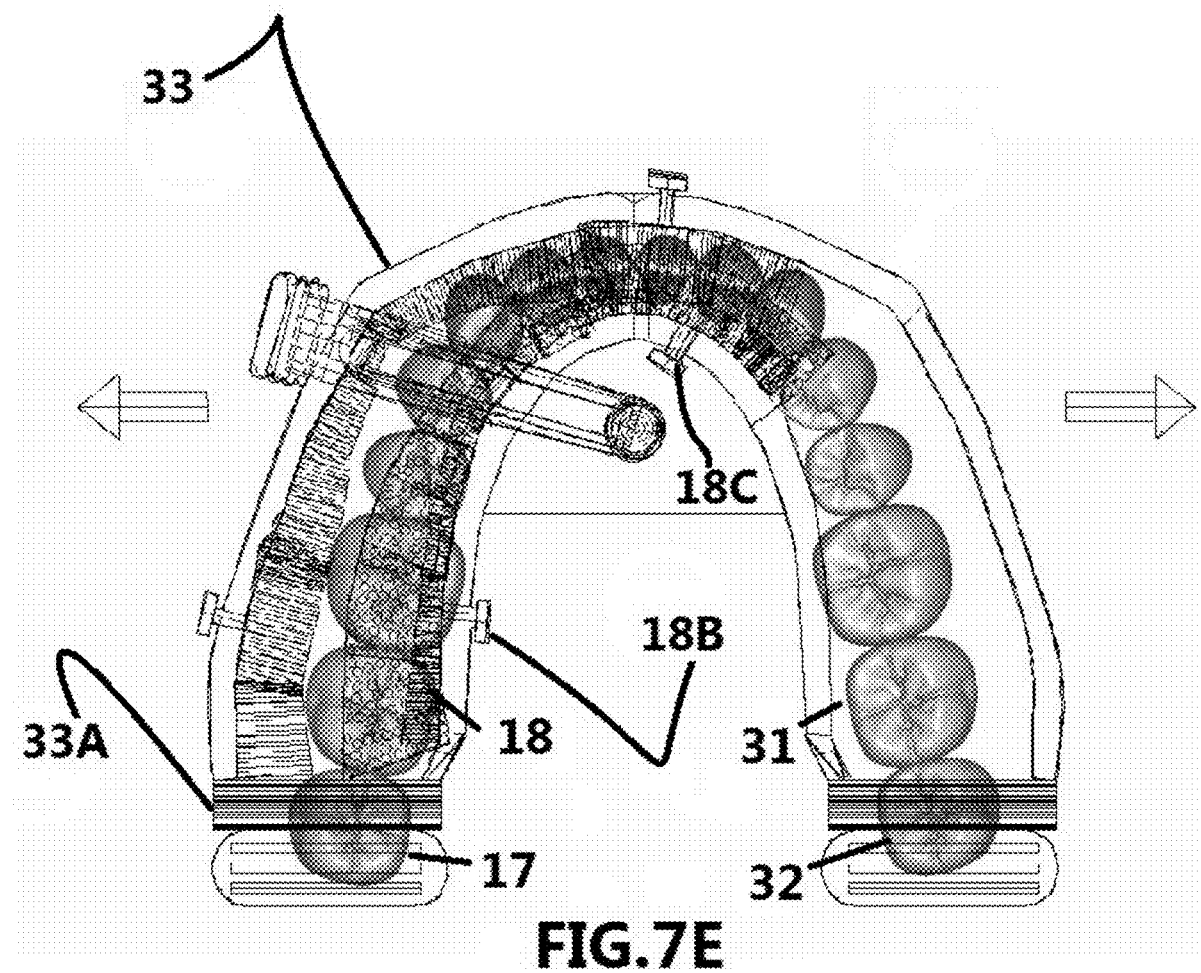
Figure 7F:
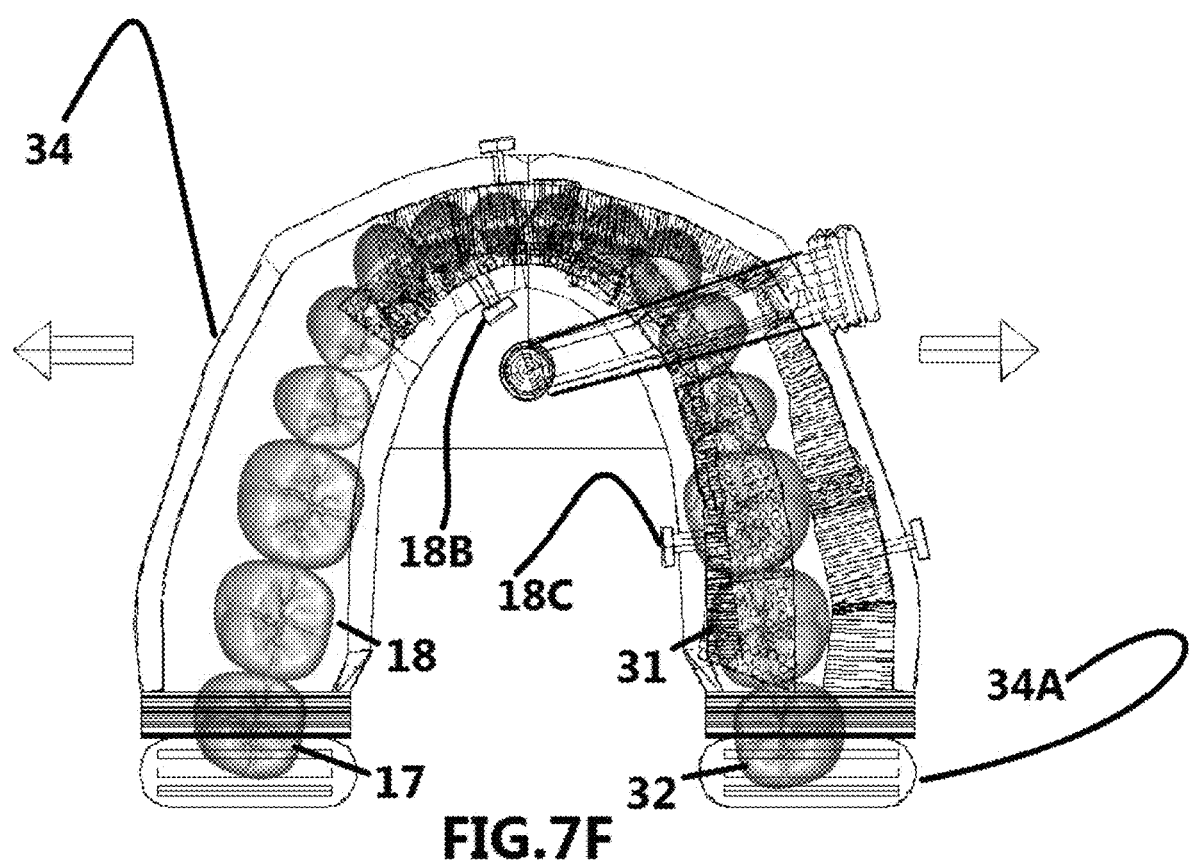

In FIG. 7D illustrates the oral insertion's pivot axle curved and parallel covering the teeth upper right side. And the back upper molar teeth area is partially numbered in this figure. The 2nd, 3RD molar teeth consist of lower teeth that's label 2, 1, 15, 16 on the end 32 shows the inner right side rail slot knob that normally positioned beneath the double level swivel stabilizer housing for the rotate shaft pin. The rail slot knob now exposed when in usage 18C. In FIG. 7E illustrates a detailed x-ray view of the oral insertion's pivot axle curved and parallel covering the teeth lower left side. And the back lower molar teeth area is partially numbered in this figure. The 2nd, 3RD molar teeth consist of lower teeth that's label 32, 31, 17, 18 on the end 33 shows the inner left side rail slot knob that normally positioned beneath the double level swivel stabilizer housing for the rotate shaft pin. The rail slot knob now exposed when in usage 18B shows detailed x-ray view of the inner right rail slot knob that's performing an act is positioned further left in that's beneath and between two surface level of swivel stabilizer housing 18C a view of the $3^{RD}$ molar numbered 17, 32 are positioned on the level support platform area and the gap tilt lift platform area of the oral insertion in this FIG. 33A. In FIG. 7F illustrates a detailed x-ray view of the oral insertion's pivot axle curved and parallel covering the teeth lower right side. And the back lower molar teeth area is partially numbered in this figure. The 2nd, 3RD molar teeth consisted lower teeth that's label 32, 31, 17, 18 on the end 34 shows detailed x-ray view of the inner left rail slot knob that's performing an act is positioned further right in that's beneath and between two surface level of swivel stabilizer housing 18B shows the inner right side rail slot knob that normally positioned beneath the double level swivel stabilizer housing for the rotate shaft pin. The rail slot knob now exposed when in usage 18C a view of the 3RD molar numbered 17, 32 are positioned on the level support platform area and the gap tilt lift platform area of the oral insertion in this FIG. 34A.

Figure 8A:
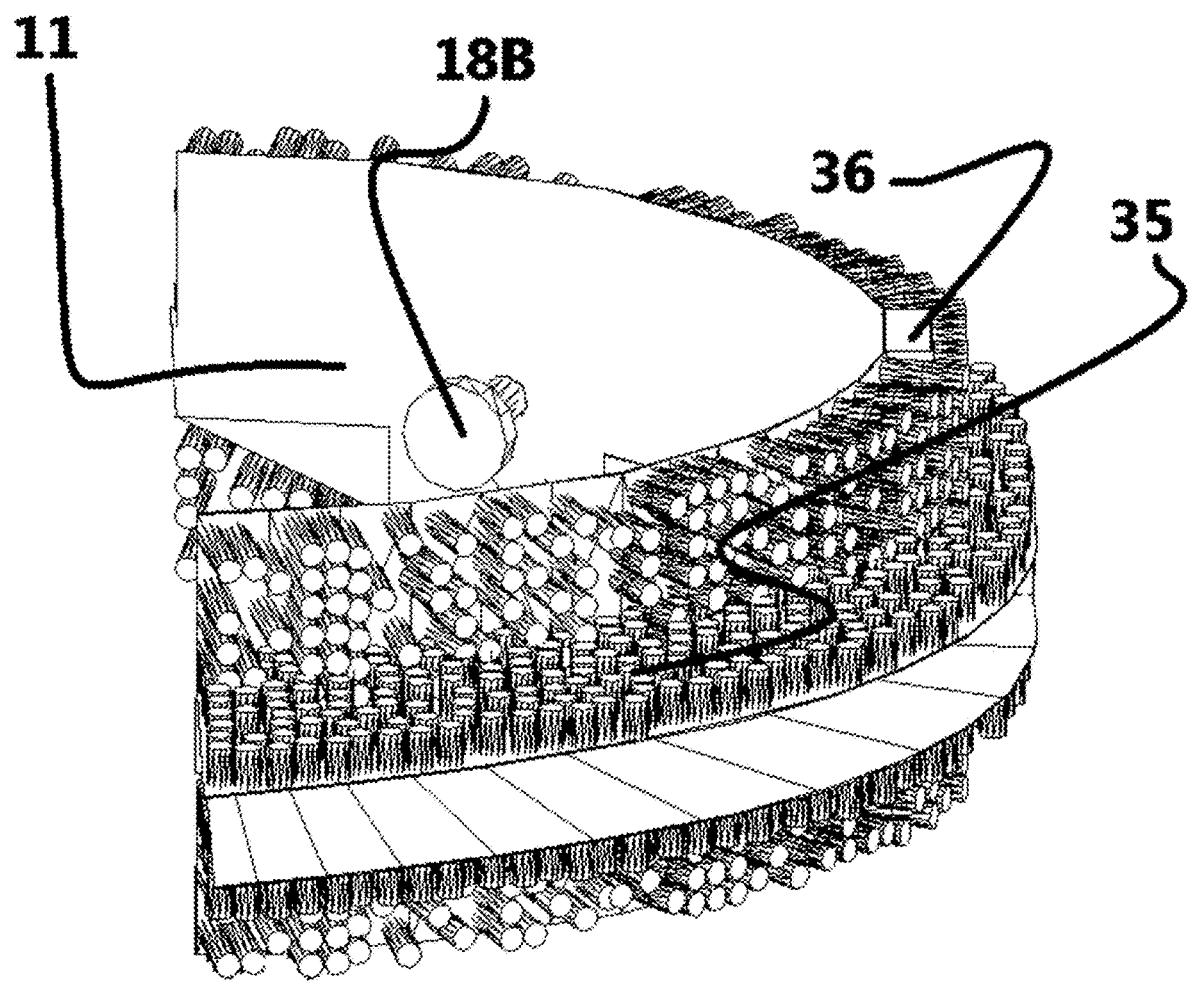
FIG. 8A-8F. an enlarged detail images of the inner and out disposable attached double level panorama form bristle brush. The images are design with rail slot knobs to keep the brush in the tracks that stack between upper level and lower level bristle brush. And also enlarged view of the upper, lower base level swivel stabilizer and rotate shaft pin.
Figure 8B:
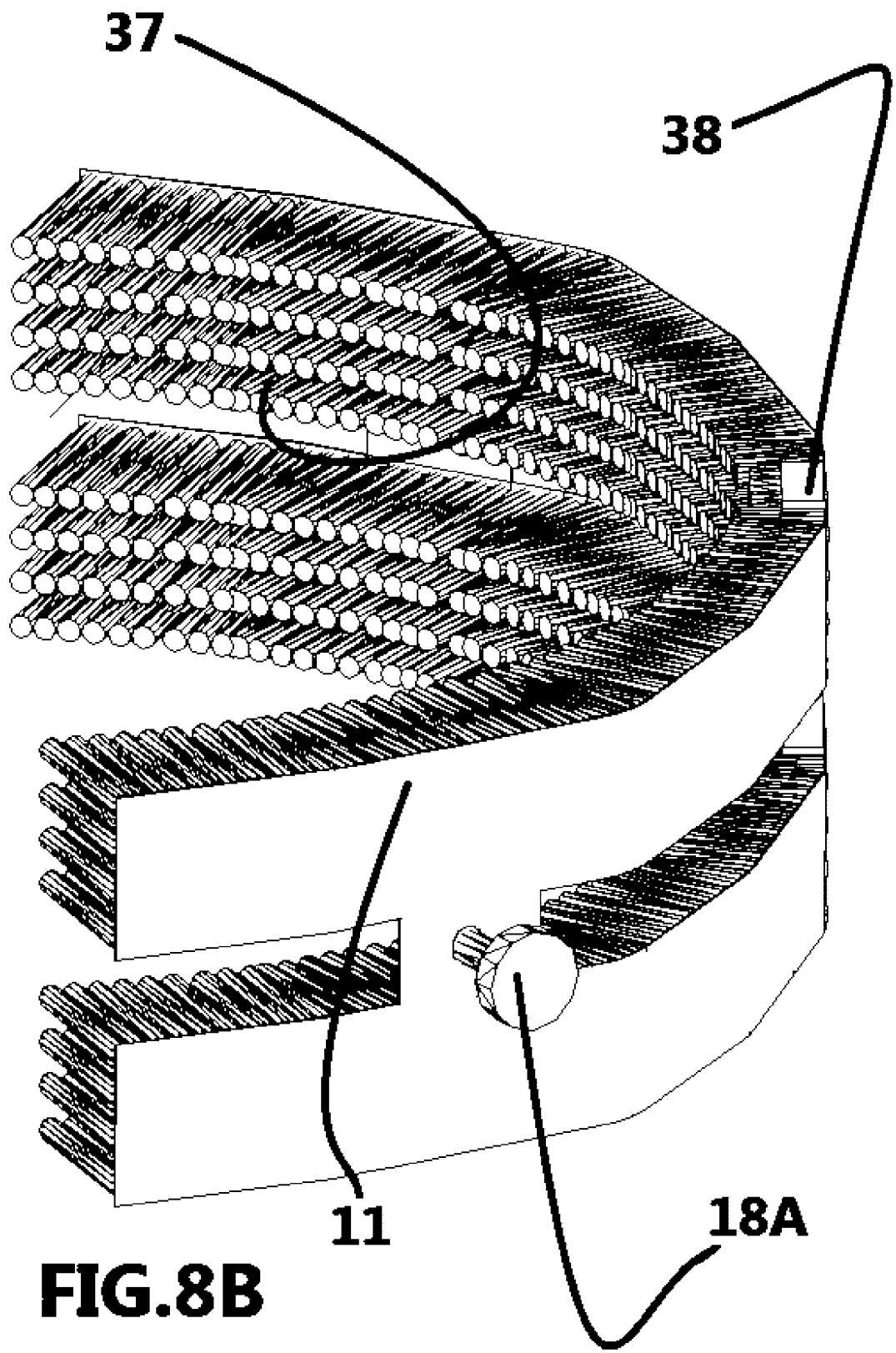
Figure 8C:
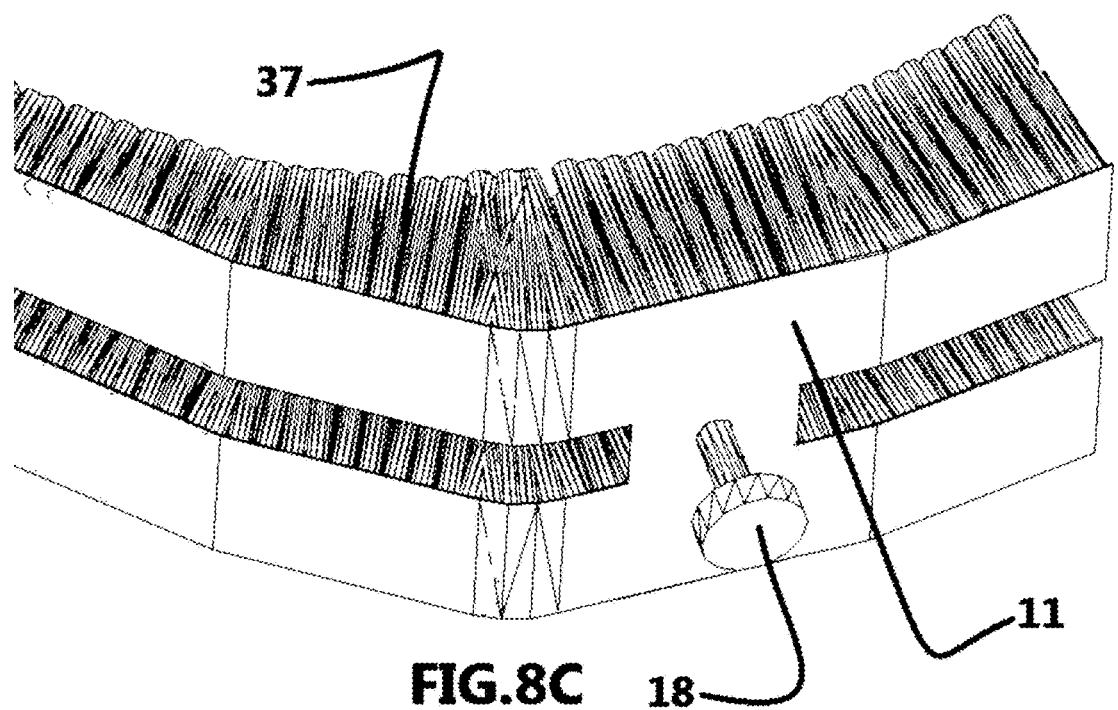
Figure 8D:
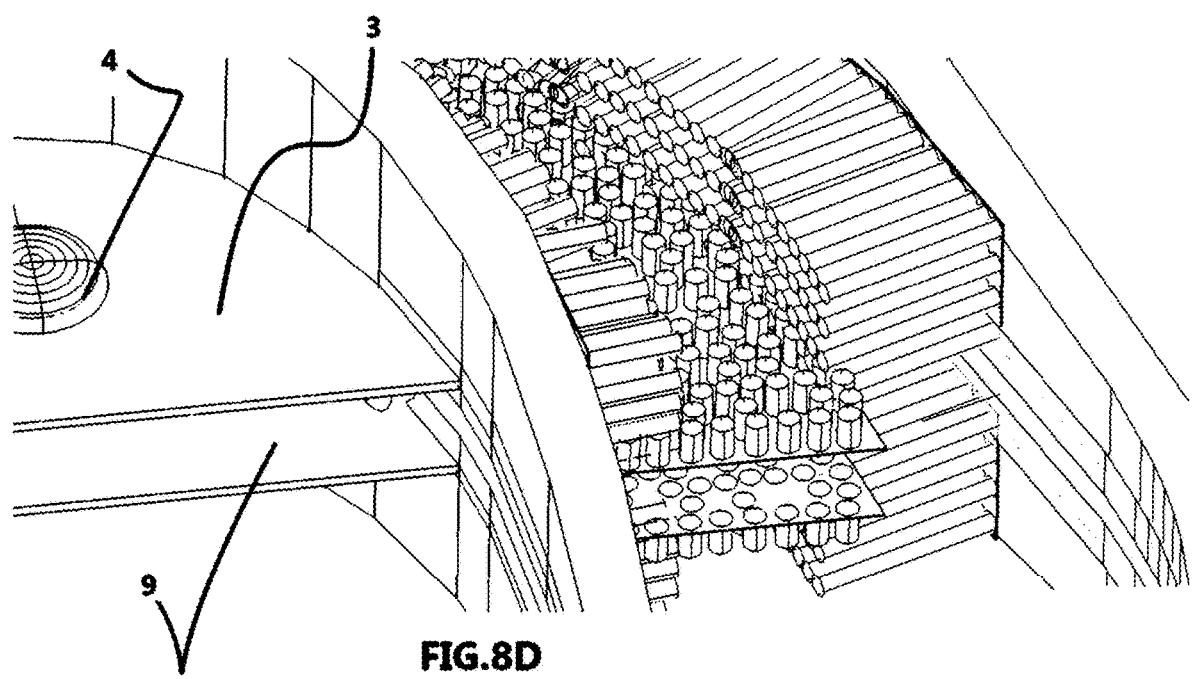
Figure 8E:
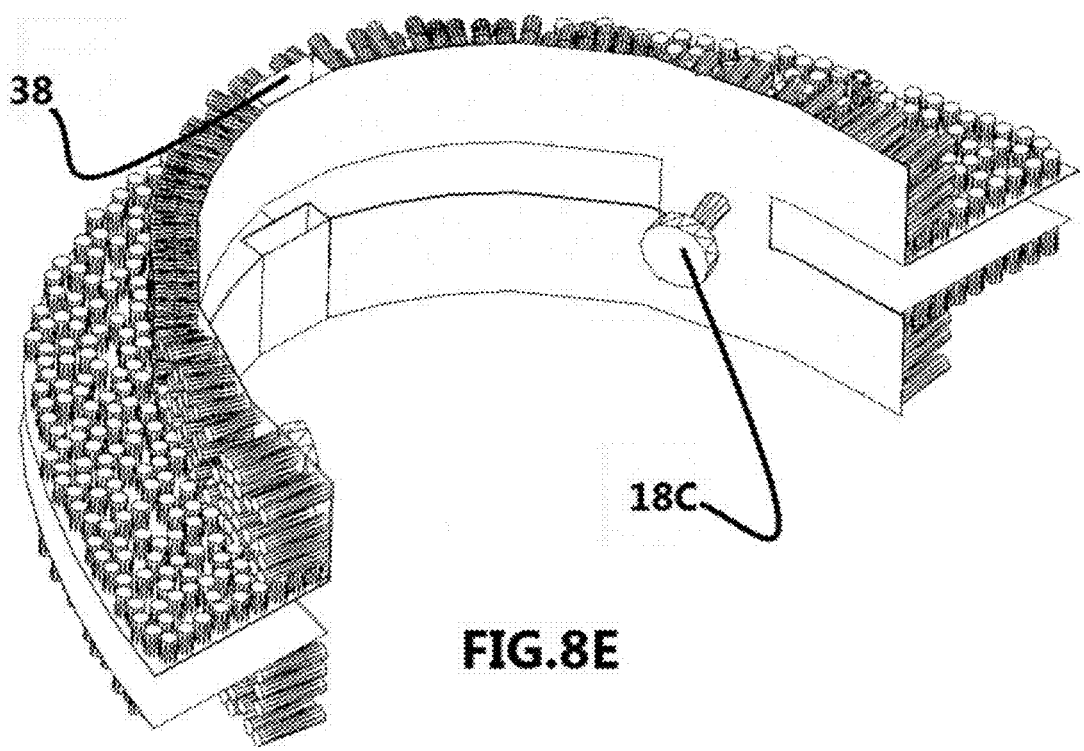
Figure 8F:
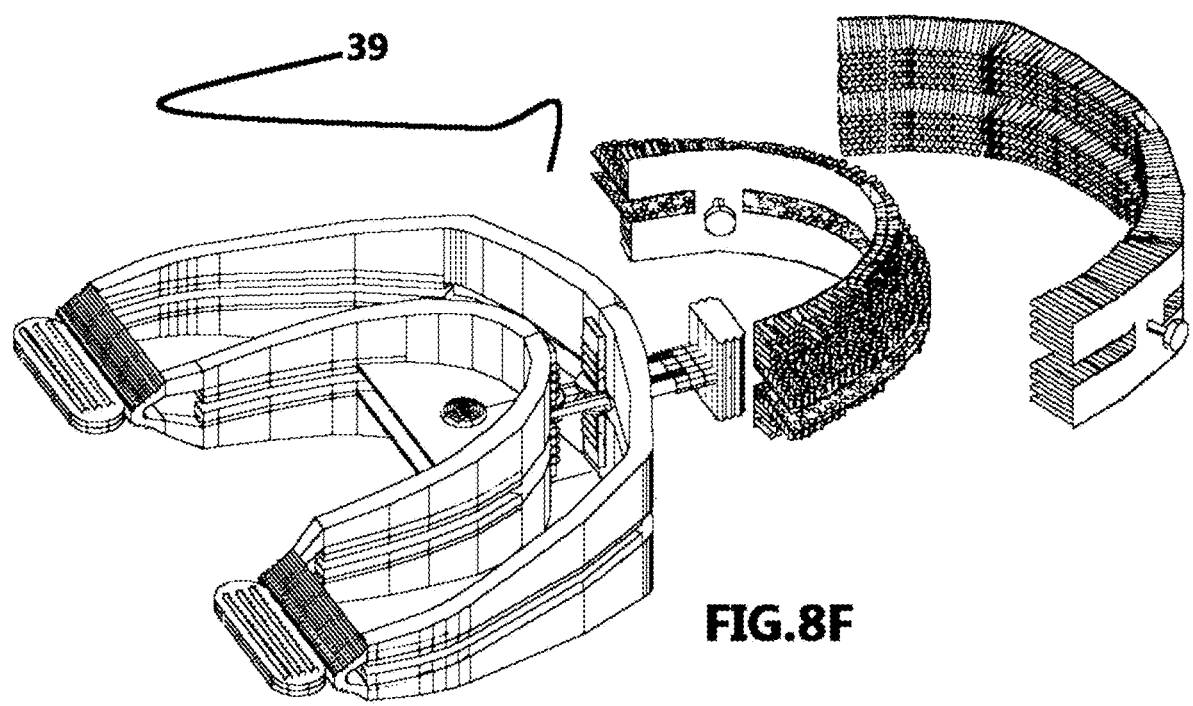

FIGS. 8A-8F shows an embodiment of this invention. FIG. 8A shows inner disposable double levels attach bristle brush. Shows the disposable attach flexible flat surface of the bristle brush 11 shows the inner left side rail slot knob 18B a detailed view of the horizontal inner double level attach bristle brush that's made to clean the bottom surface teeth 35 shows the area of the inner double level attach bristle brush inserts and hook into the opening slot chamber. This slot chamber insert in the double swivel pin slot hook axle 36 In FIG. 8B shows the disposable attach flexible flat surface of the bristle brush 11 illustrates the outer right rail slot knob designed to keep the double level bristle brush on the oral insertion tracks 18A a detailed view of the vertical outer double level attach bristle brush that's made to clean the outer front surface of the teeth 37 shows the area of the outer double level attach bristle brush inserts and hook into the opening slot chamber. This slot chamber insert in the double swivel pin slot hook axle 38 In FIG. 8C shows an enlarged view of the disposable attach flexible flat surface of the bristle brush 11 illustrates a enlarged detail understanding of the outer left rail slot knob designed to keep the double level bristle brush on the oral insertion tracks 18 an enlarged detail view of the vertical outer double level attach bristle brush that's made to clean the outer front surface of the teeth 37. In FIG. 8D an enlarged visual of the upper level swivel stabilizer 3 an enlarged detail view of the rotate shaft pin 4 illustrates an enlarged view of the bottom base double level swivel stabilizer that's a housing of the rotate shaft pin 9. In FIG. 8E shows enlarged view of inner right side rail slot knob that normally positioned beneath the double level swivel stabilizer housing for the rotate shaft pin. The rail slot knob now exposed when in usage 18C shows enlarged view of the area for its outer double level attach bristle brush to insert and hook into the opening slot chamber. This slot chamber insert in the double swivel pin slot hook axle 38. In FIG. 8F a detailed enlarged view of a whole complete dismantle oral insertion 39.

Figure 9A:
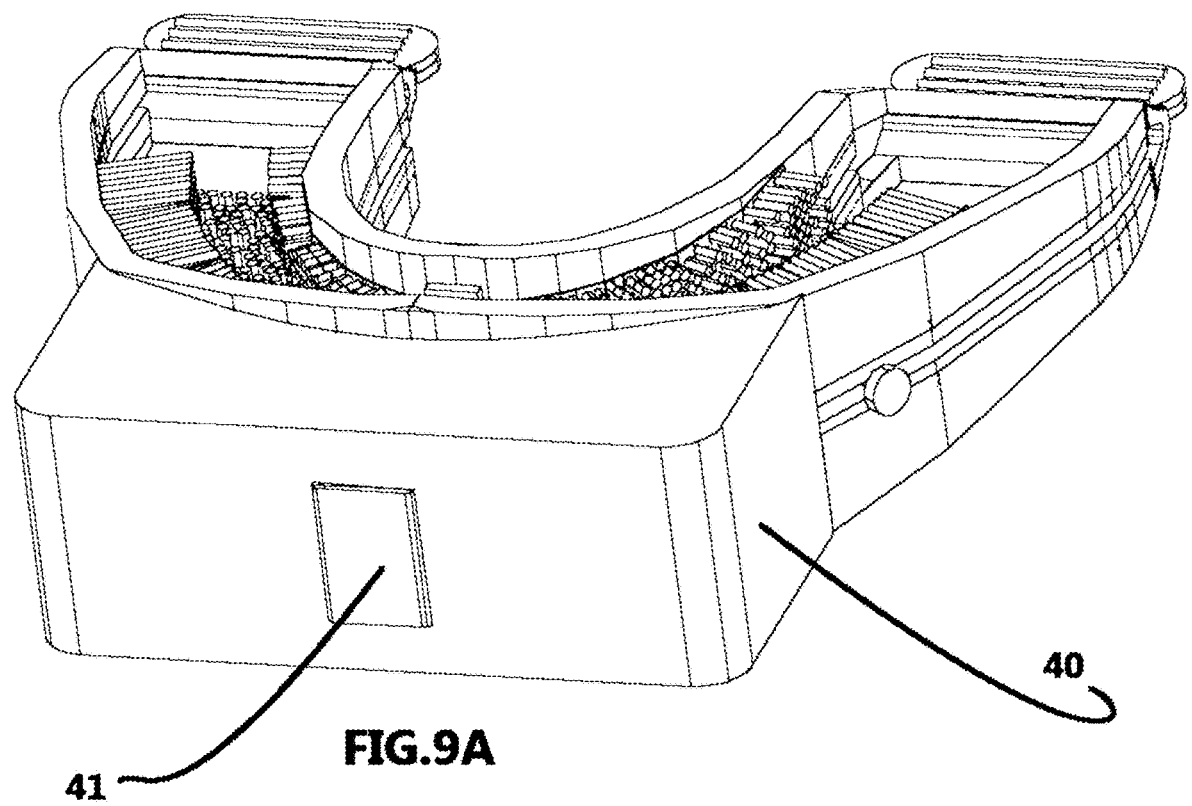
FIG. 9A-9D. a view of a powered motorized button control oral insertion that's fitted with supply and return tubes in liquid vacuum container unit. The complete powered unit view on an upper right angle back side view, front upper view.
Figure 9B:
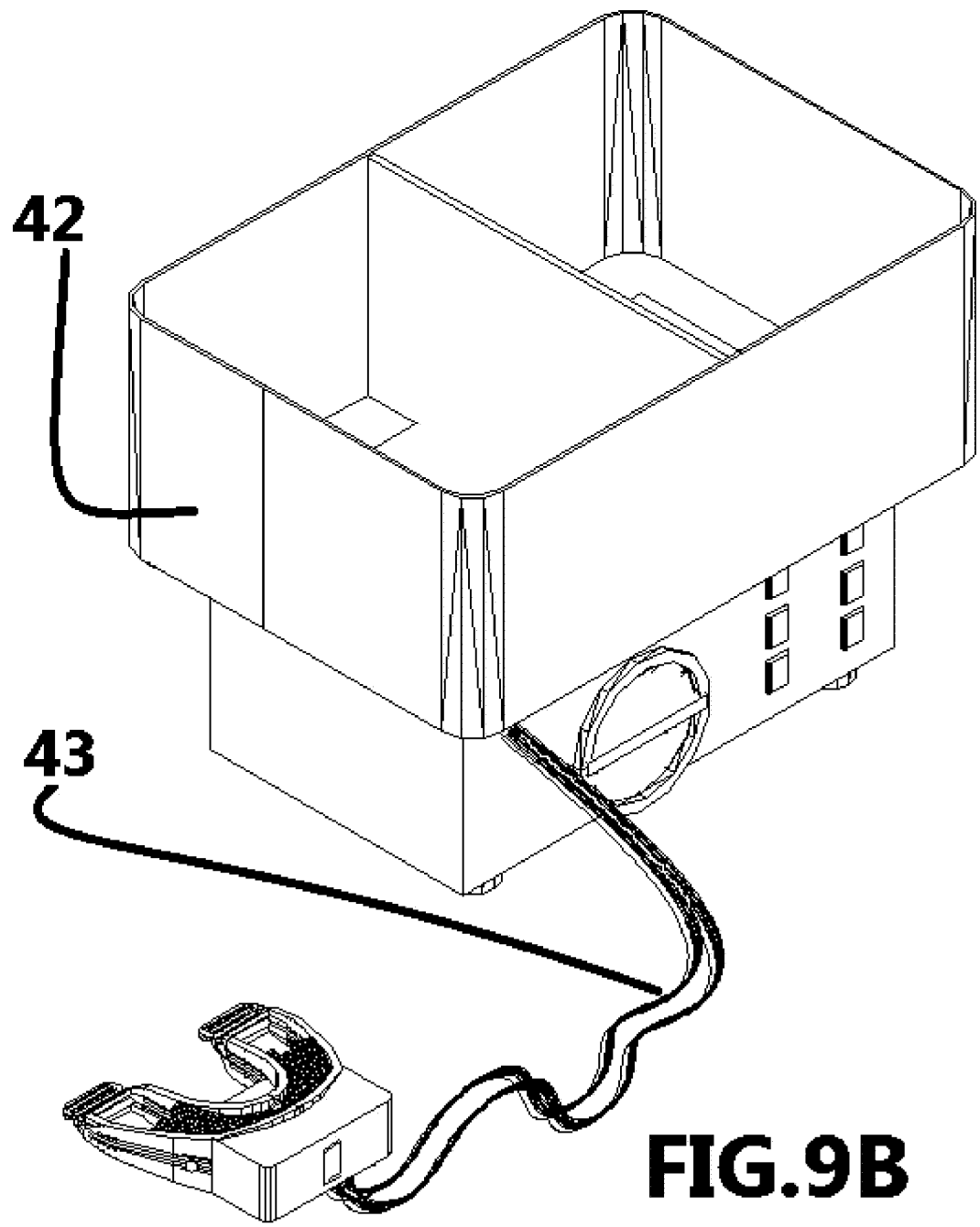
Figure 9C:
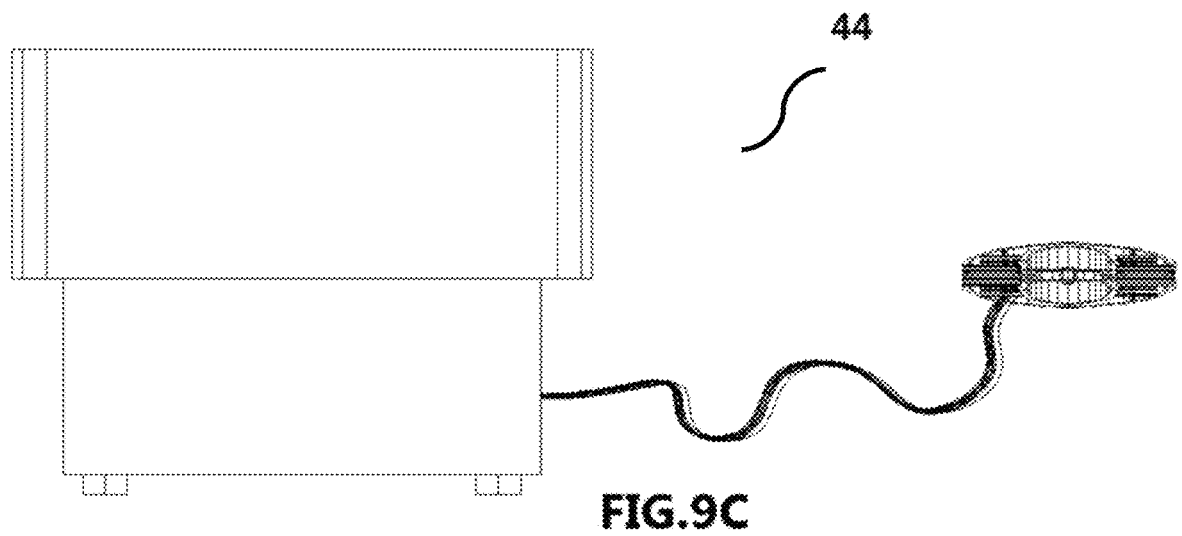
Figure 9D:
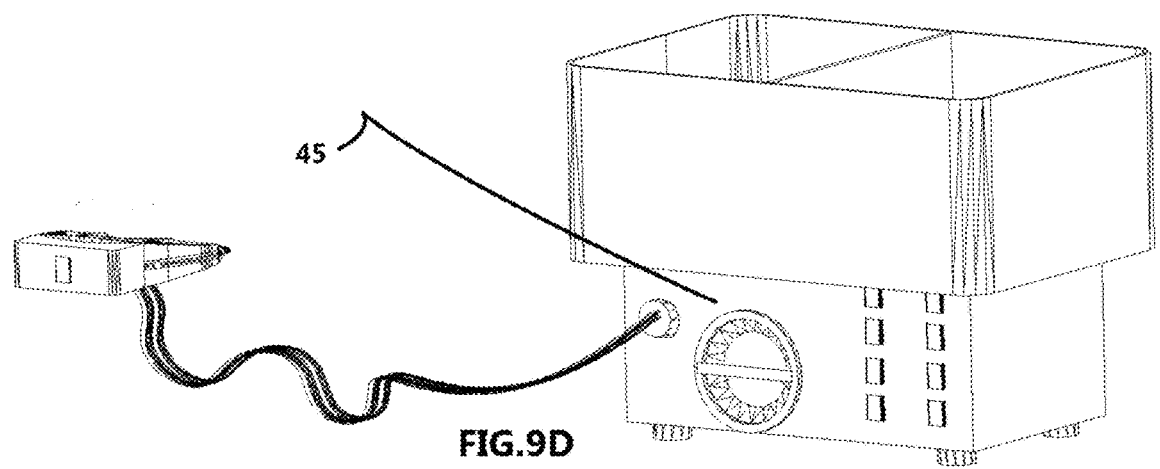

FIGS. 9A-9D shows an embodiment of this invention. FIG. 9A an enlarged view of the rechargeable electric control motor driven oral insertion 40 shows an operation off and on click button 41. In FIG. 9B shows an electric liquid and return container unit. The container unit has a divided liquid holder. The liquid holder has a section for supply clean liquid and section for return unclean liquid 42 shows a supply and return tubes with connect adapters. The oral insertion and electric liquid and return container unit features a connection adapter area for the tubes 43. In FIG. 9C shows back view of the oral insertion and electric liquid and return container unit 44. In FIG. 9D shows a left tilted angle front view of the oral insertion and electric liquid and return container unit that feature its speed dial and control buttons 45

Figure 10A:
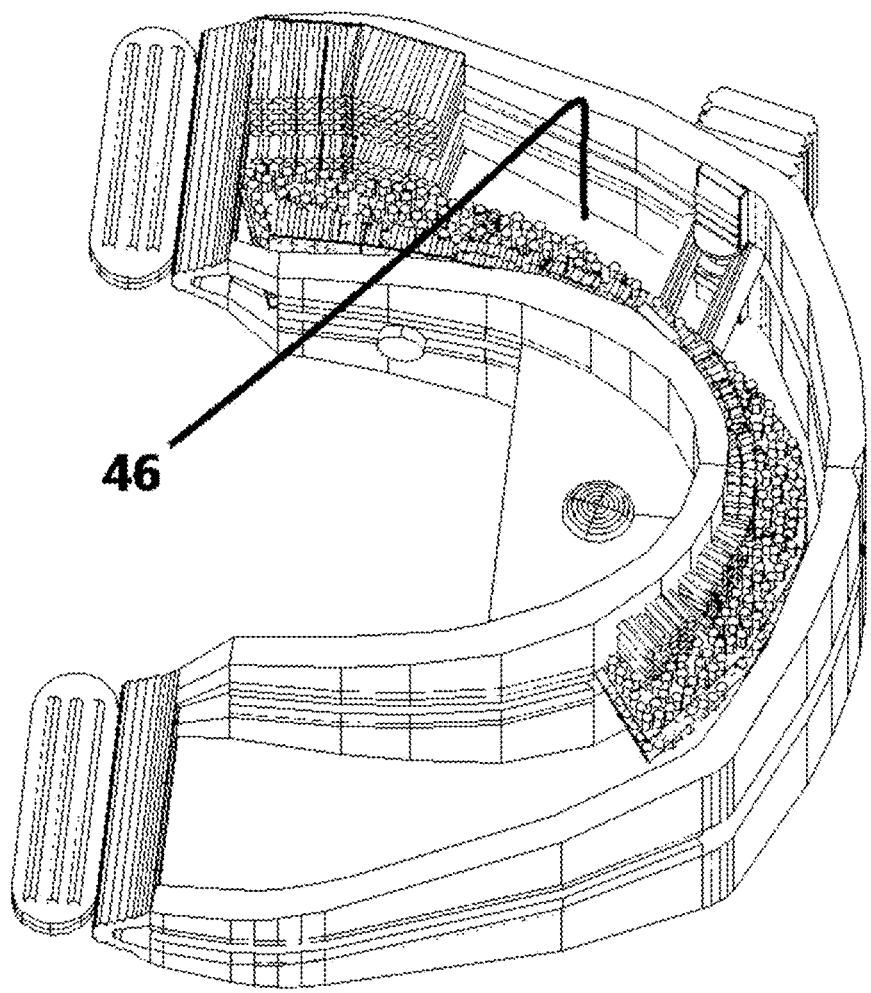
FIG. 10A-10E. an all complete texture enlarged views of the rear straight, rear angle right, rear angle left, upper right, with partial section out of bristle brush view on detail designs.
Figure 10B:
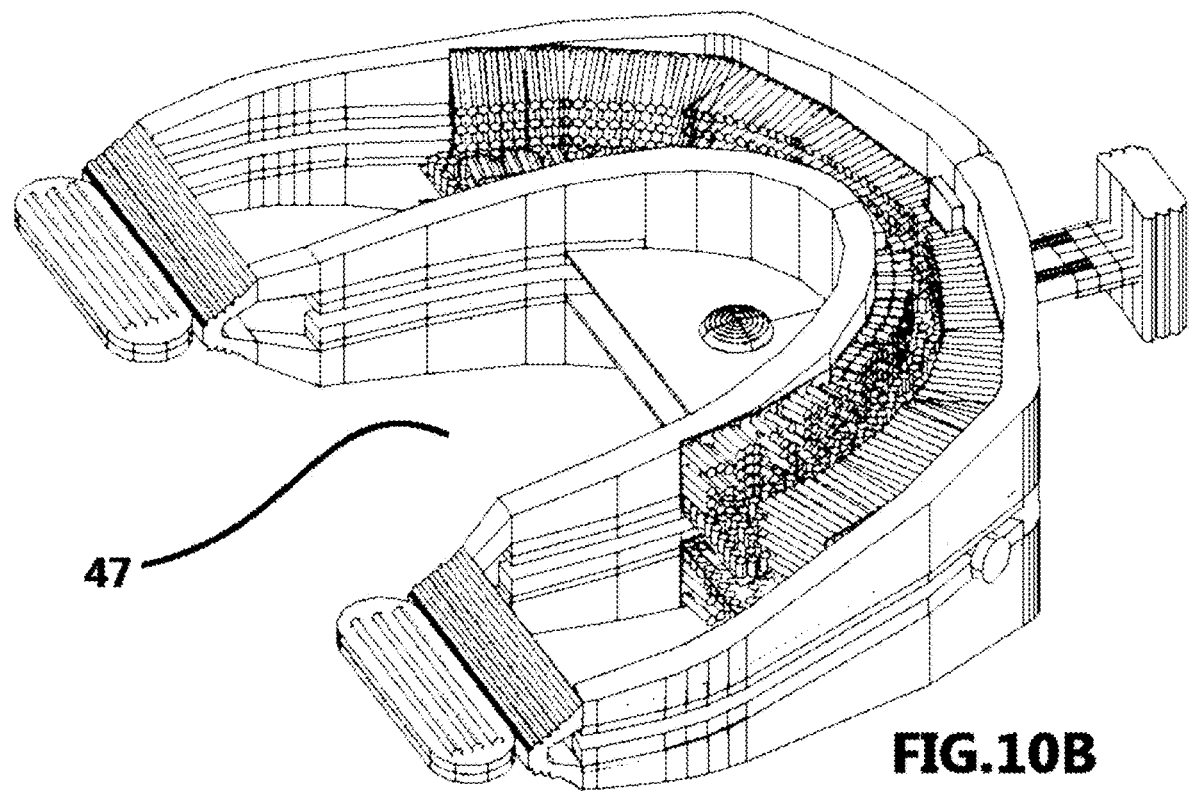
Figure 10C:
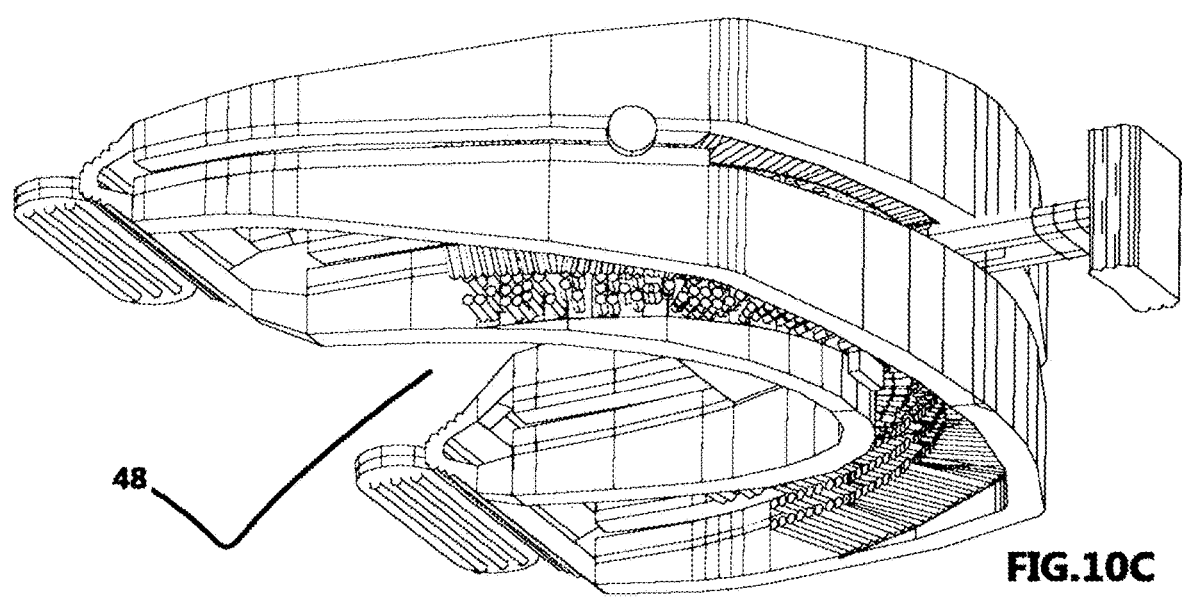
Figure 10D:
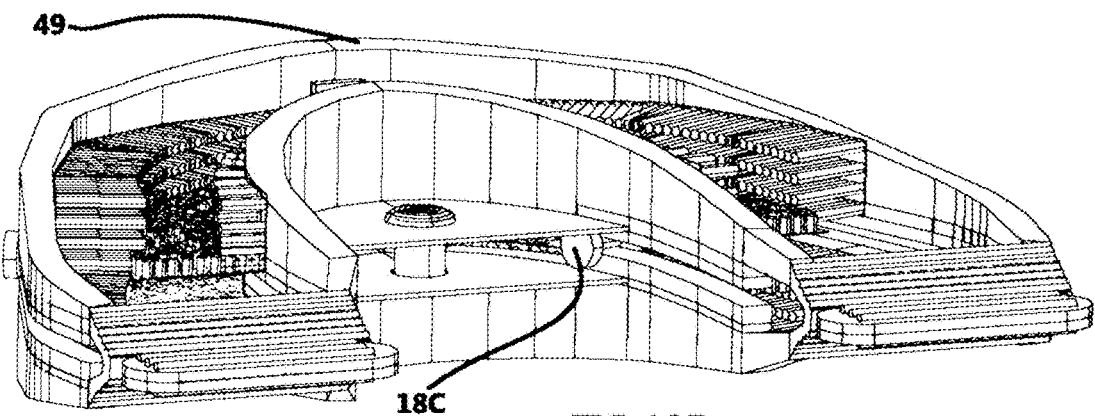
Figure 10E:
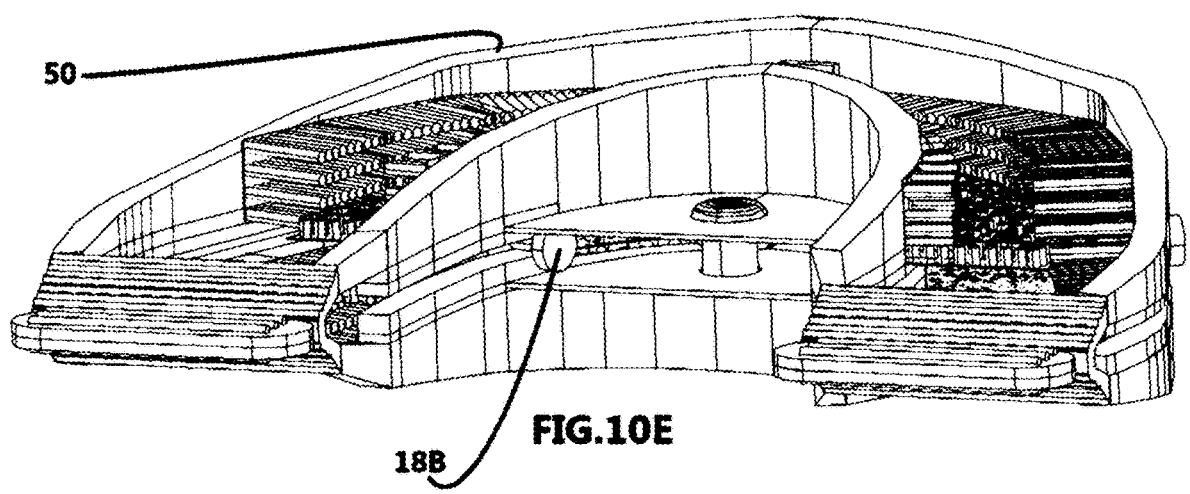

FIGS. 10A-10E shows an embodiment of this invention. FIG. 10A a detailed upper right enlarged view for the oral insertion. Illustrates the partial device that's has an empty section to show its bristle brush for insight on the oral insertion gadgetry 46. In FIG. 10B a detailed view of the lower right angle of the oral insertion with pivot axle positioned equidistant 47. In FIG. 10C shows an enlarged detail image of the bottom front right oral insertion with pivot axle positioned equidistant 48. In FIG. 10D shows an enlarged rear angle tilted left of the oral insertion 49 shows the inner right side rail slot knob that normally positioned beneath the double level swivel stabilizer housing for the rotate shaft pin. The rail slot knob now exposed when in usage 18C. In FIG. 10E shows an enlarged rear angle tilted right of the oral insertion 50 shows the inner left side rail slot knob that normally positioned beneath the double level swivel stabilizer housing for the rotate shaft pin. The rail slot knob now exposed when in usage 18B

BACKGROUND OF THE INVENTION

In this modern day society of age we keep evolving with problem solving techniques to manipulate the standard form when it pertains to oral dental devices. The new inventions challenge the social understanding with advancements in dental sector. The social practice in collaborative discussion and functionality debates will continue on social design.

This new invention carries a critical analysis in the dental environment. The new invention is set in place common pitfalls, to counter its risk to automated acceptance among social uncertainty within the dental sector.

The present new invention hurdles in great potential solutions for people dealing with weaker upper strength impairment on the body. For example person's lack muscle loss due to taking in prescription medication or other weak causes on the upper human body.

The conventional tooth brush is a traditional dental device that would be hard to manage in an impairment condition, because it takes highly maneuverable mobile muscle procedure in the arms, wrists, hands, to use that ordinary electric, manual tooth brush.

The present new invention is more manageable in a parallels performed act by oscillate or swiveling left or right on its pivot axle.

The invention claimed is:

1. An oral insertion assembly comprising:
an upper arch panorama and a lower arch panorama;
a molar gap tilt lift platform attached to a posterior side of each of the upper arch and lower arch panoramas and configured to be placed at least partly between a user's second molars or third molars thus creating a maneuverability space between the user's upper and lower jaw; and
a swivel mechanism attachable to a bristle brush assembly to drive a motion of the bristle brush assembly in a reciprocating manner and disposed between the upper arch panorama and the lower arch panorama,
wherein the molar gap tilt lift platform has surface grips configured to scrape the teeth.

2. The oral insertion assembly of claim 1, wherein the upper arch panorama and the lower arch panorama are disposable.

3. The oral insertion assembly of claim 1, the bristle brush assembly comprises
a bristle brush positioned for contacting at least one of the one the lingual, occlusal, or buccal surfaces of a user's teeth on each of the user's upper arch and lower arch;
an attachment region configured to reversibly connect with a bristle brush assembly driving mechanism; and
at least one rail slot knob on the lingual or buccal side of bristle brush assembly configured to track rail slots on the lingual or buccal side of the oral insertion assembly.

4. The oral insertion assembly of claim 3, wherein the bristle brush is configured to contact the lingual and the occlusal surfaces of the user's teeth on the user's upper arch and lower arch.

5. The oral insertion assembly of claim 3, wherein the bristle brush is configured to contact the buccal surfaces of the user's teeth on both the user's upper arch and lower arch.

6. The oral insertion device of claim 3, further comprising the swivel mechanism reversibly attachable to a second bristle brush assembly to drive a motion of the second bristle brush assembly;
the second bristle brush assembly comprising
a second bristle brush positioned for contacting the buccal surfaces of the user's teeth on both the user's upper arch and lower arch;
a second attachment region configured to reversibly connect with the bristle brush assembly driving mechanism; and
at least one rail slot knob on the buccal side of bristle brush assembly configured to track the rail slots on the buccal side of the oral insertion assembly,
wherein the bristle brush is configured to contact the lingual and the occlusal surfaces of the user's teeth on both the user's upper arch and lower arch.

7. The oral insertion assembly of claim 3, the bristle brush assembly comprising
a first horizontal bristle brush for cleaning bottom surfaces of a user's upper teeth;
a second horizontal bristle brush for cleaning top surfaces of a users' slower teeth;
a first outer, vertical bristle brush for cleaning the outer, front surface of a user's upper teeth; and
a second outer, vertical bristle brush for cleaning the outer, front surface of a user's lower teeth.

8. The oral insertion assembly of claim 3, the attachment region further comprising
a plurality of slot chambers for receiving a plurality of double swivel pin slot hook axles disposed on the bristle brush assembly driving mechanism,
wherein each of the double swivel pin slot hook axles are inserted into a respective slot chamber of the plurality of slot chambers on the bristle brush assembly.

9. An oral insertion assembly comprising:
an upper arch panorama and a lower arch panorama;
a molar gap tilt lift platform attached to a posterior side of each of the upper arch and lower arch panoramas and configured to be placed at least partly between a user's second molars or third molars thus creating a maneuverability space between the user's upper and lower jaw;
a swivel mechanism attachable to a bristle brush assembly to drive a motion of the bristle brush assembly in a reciprocating manner and disposed between the upper arch panorama and the lower arch panorama; and
the bristle brush assembly disposed in a portion of each of the upper arch panorama and the lower arch panorama, the bristle brush assembly including at least one bristle brush positioned for contacting at least one of the lingual, occlusal or buccal surfaces of the user's teeth on at least one of the user's upper arch or the user's lower arch and connected to the swivel mechanism using at least one rail slot knob on the lingual or buccal side of the bristle brush assembly configured to track rail slots on the lingual or buccal side of the oral insertion assembly.

10. The oral insertion assembly of claim 9, the bristle brush assembly further comprises a second bristle brush of the at least one bristle brush positioned for contacting another of the lingual, occlusal, or buccal surfaces of the user's teeth on the user's upper arch or the user's lower arch not contacted by a first bristle brush of the at least one bristle brush.

11. The oral insertion assembly of claim 9, the track rail slots including first and second tracks located in the upper arch panorama and third and fourth tracks located in the lower arch panorama, and the oral insertion apparatus further comprising
- a plurality of double swivel pin slot hook axles disposed on the operable swivel mechanism including at least one double swivel pin slot hook axle in each of the first, second, third, and fourth tracks; and
- a plurality of slot chambers on the bristle brush assembly, wherein each of the double swivel pin slot hook axles are inserted into a respective slot chamber of the plurality of slot chambers on the bristle brush assembly.

12. The oral insertion assembly of claim 11, further comprising:
- a plurality of rail track slot knobs disposed on the bristle brush assembly, wherein a respective one of the plurality of rail track slot knobs is disposed in each of the first, second, third, and fourth tracks of the upper and lower level panoramas, and
- a pivot axle thumb tab configured to allow the user to control touch and oscillation handling of the bristle brush assembly with a thumb and fingertip.

13. An oral insertion assembly comprising:
- an upper arch panorama and a lower arch panorama;
- a molar gap tilt lift platform attached to a posterior side of each of the upper arch and lower arch panoramas and configured to be placed at least partly between a user's second molars or third molars thus creating a maneuverability space between the user's upper and lower jaw;
- a swivel mechanism attachable to a bristle brush assembly to drive a motion of the bristle brush assembly in a reciprocating manner and disposed between the upper arch panorama and the lower arch panorama; and
- a stabilizer housing including a pin attached to two supports, wherein the swivel mechanism is rotatably attached to the pin between the two supports so that the swivel mechanism is configured to oscillate the bristle brush assembly within the upper and lower arch panoramas.

14. A method of operating an oral insertion apparatus, the method comprising the steps of:
- connecting a bristle brush assembly including a first bristle brush positioned for contacting at least one of the lingual, occlusal or buccal surfaces of a user's teeth on an upper arch of the user;
- further connecting a second bristle brush of the bristle brush assembly positioned for contacting at least one of the lingual, occlusal or buccal surfaces of the user's teeth on a lower arch of the user;
- providing at least one rail slot knob on the lingual or buccal side of the bristle brush assembly to both a track rail slot on the lingual or buccal side of an oral insertion apparatus and a swivel mechanism, the oral insertion apparatus having an upper arch panorama and a lower arch panorama connected in the posterior with a molar gap tilt lift platform;
- inserting the oral insertion apparatus into the user's mouth placing the molar gap tilt lift platform at least partially between the user's second molars or third molars;
- placing the upper arch panorama over the user's upper arch and the lower arch panorama over the user's lower arch; and
- actuating the swivel mechanism to drive the first and second bristle brushes along the user's teeth.

15. An oral hygienic application device comprising:
- an oral insertion assembly comprising a disposable upper level panorama and a disposable lower level panorama;
- a molar gap tilt lift platform attached to a rear of the upper and lower level panoramas and configured to be placed between a user's third molars thus creating a space between the user's upper and lower jaw;
- a bristle brush assembly disposed in a portion of the upper level panorama and the lower level panorama;
- a manually operable swivel mechanism attached to the bristle brush assembly and disposed between the upper level panorama and the lower level panorama; and
- a stabilizer housing including a pin attached to two supports, wherein the manually operable swivel mechanism is rotatably attached to the pin between the two supports so that the manually operable swivel mechanism is configured to oscillate the bristle brush assembly within the upper and lower level panoramas,
- wherein the manually operable swivel mechanism is configured to be dismantled thereby allowing easy replacement of a used bristle brush assembly on the oral hygienic application device.

16. The oral hygienic application device, as defined by claim 15, wherein the oral insertion assembly, the molar gap tilt lift platform, and the bristle brush assembly are formed from a material selected from the group consisting of plastic materials.

17. The oral hygienic application device, as defined by claim 15, wherein the oral insertion assembly, the molar gap tilt lift platform, and the bristle brush assembly are formed of an elastic polymeric material selected from the group consisting of rubber materials.

18. The oral hygienic application device, as defined by claim 17, further comprising:
- first and second tracks located in the upper level panorama; third and fourth tracks located in the lower level panorama;
- a plurality of double swivel pin slot hook axles disposed on the manually operable swivel mechanism including at least one double swivel pin slot hook axle in each of the first, second, third, and fourth tracks; and
- a plurality of slot chambers on the bristle brush assembly, wherein each of the double swivel pin slot hook axles are inserted into a respective slot chamber of the plurality of slot chambers on the bristle brush assembly.

19. The oral hygienic application device, as defined by claim 15, wherein the oral insertion assembly, the molar gap tilt lift platform, and the bristle brush assembly are formed of a stainless steel material selected from the group consisting of metals.

20. The oral hygienic application device, as defined by claim 19, wherein the molar gap tilt lift platform is placed between upper molars, teeth 1 and 16,
- according to the standard tooth numbering diagram system, and lower molars, teeth 32, 17, according to the standard tooth numbering diagram system, and wherein the molar gap tilt lift platform further comprises:
- molar surface grips configured to clean and scrape surfaces of the molar teeth; and
- a second molar tilt lift platform configured to be disposed between upper molars, teeth 2 and 15, according to the standard tooth numbering diagram system, and lower molars, teeth 31 and 18, according to the standard tooth numbering diagram system.

21. The oral hygienic application device, as defined by claim 19, further comprising
- a plurality of rail track slot knobs disposed on the bristle brush assembly, wherein a respective one of the plurality of rail track slot knobs is disposed in each of the first, second, third, and fourth tracks of the upper and lower level panoramas, wherein the bristle brush assembly includes:

a first horizontal bristle brush for cleaning bottom surfaces of a user's upper teeth, and a second horizontal bristle brush for cleaning top surfaces of a users' slower teeth;

a first outer, vertical bristle brush for cleaning the outer, front surface of a user's upper teeth;

a second outer, vertical bristle brush for cleaning the outer, front surface of a user's lower teeth; and a pivot axle thumb tab configured to allow the user to control touch and oscillation handling of the bristle brush assembly with a thumb and fingertip.

\* \* \* \* \*